United States Patent
Martin et al.

(10) Patent No.: US 12,244,784 B2
(45) Date of Patent: Mar. 4, 2025

(54) MULTIVIEW INTERACTIVE DIGITAL MEDIA REPRESENTATION INVENTORY VERIFICATION

(71) Applicant: Fyusion, Inc., San Francisco, CA (US)

(72) Inventors: Keith George Martin, San Francisco, CA (US); Dave Morrison, San Francisco, CA (US); Stefan Johannes Josef Holzer, San Mateo, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 918 days.

(21) Appl. No.: 16/937,884

(22) Filed: Jul. 24, 2020

(65) Prior Publication Data

US 2021/0037230 A1  Feb. 4, 2021

Related U.S. Application Data

(60) Provisional application No. 62/879,859, filed on Jul. 29, 2019.

(51) Int. Cl.
*G06V 20/64* (2022.01)
*G06V 20/52* (2022.01)
(Continued)

(52) U.S. Cl.
CPC ........... *H04N 13/282* (2018.05); *G06V 20/52* (2022.01); *G06V 20/64* (2022.01); *H04N 13/275* (2018.05);
(Continued)

(58) Field of Classification Search
CPC .... H04N 13/282; H04N 13/275; G06V 20/52; G06V 20/64; G06V 20/625; G06V 2201/08; G06V 20/20
See application file for complete search history.

(56) References Cited

U.S. PATENT DOCUMENTS

| | | |
|---|---|---|
| 5,764,306 A | 6/1998 | Steffano |
| 5,923,380 A | 7/1999 | Yang |

(Continued)

FOREIGN PATENT DOCUMENTS

| | | |
|---|---|---|
| GB | 2573170 A | 10/2019 |
| WO | 2016064921 A1 | 4/2016 |

(Continued)

OTHER PUBLICATIONS

Zhou, X. Q., H. K. Huang, and Shieh-Liang Lou. "Authenticity and integrity of digital mammography images." IEEE transactions on medical imaging 20.8 (2001): 784-791. (Year: 2001).*

(Continued)

*Primary Examiner* — Siamak Harandi
*Assistant Examiner* — Denise G Alfonso
(74) *Attorney, Agent, or Firm* — Kwan & Olynick LLP

(57) ABSTRACT

Inventory at a remote location may be verified by transmitting a security key associated with uniquely identifying object identification information from a verification server to a client machine at the remote location. The security key may then be used to generate a multi-view interactive digital media representation (MVIDMR) of the object that includes a plurality of images captured from different viewpoints. The MVIDMR may then be transmitted to the verification server.

20 Claims, 16 Drawing Sheets

(51) Int. Cl.
*H04N 13/275* (2018.01)
*H04N 13/282* (2018.01)
*G06V 20/62* (2022.01)

(52) U.S. Cl.
CPC ........ *G06V 20/625* (2022.01); *G06V 2201/08* (2022.01)

(56) References Cited

U.S. PATENT DOCUMENTS

| | | | |
|---|---|---|---|
| 6,067,369 | A | 5/2000 | Kamei |
| 6,453,069 | B1 | 9/2002 | Matsugu |
| 6,788,309 | B1 | 9/2004 | Swan |
| 6,879,956 | B1 | 4/2005 | Honda |
| 6,912,313 | B2 | 6/2005 | Li |
| 7,042,346 | B2 | 5/2006 | Paulsen |
| 7,249,019 | B2 | 7/2007 | Culy |
| 7,292,257 | B2 | 11/2007 | Kang |
| 7,565,004 | B2 | 7/2009 | Hashimoto |
| 7,949,529 | B2 | 5/2011 | Weider |
| 9,182,229 | B2 | 11/2015 | Grässer |
| 9,218,698 | B2 | 12/2015 | Ricci |
| 9,467,750 | B2 | 10/2016 | Banica |
| 9,495,764 | B1 | 11/2016 | Boardman |
| 9,886,636 | B2 | 2/2018 | Zhang |
| 9,886,771 | B1 | 2/2018 | Chen |
| 10,055,708 | B2 | 8/2018 | Kakarala et al. |
| 10,319,094 | B1 | 6/2019 | Chen |
| 10,373,387 | B1 | 8/2019 | Fields |
| 10,515,489 | B2 | 12/2019 | Jefferies et al. |
| 10,573,012 | B1* | 2/2020 | Collins ..................... G06T 7/60 |
| 10,636,148 | B1 | 4/2020 | Chen |
| 10,657,647 | B1 | 5/2020 | Chen |
| 10,698,558 | B2 | 6/2020 | Holzer |
| 11,004,188 | B2 | 5/2021 | Holzer |
| 2002/0063714 | A1 | 5/2002 | Haas |
| 2002/0198713 | A1 | 12/2002 | Franz |
| 2004/0258306 | A1 | 12/2004 | Hashimoto |
| 2007/0253618 | A1 | 11/2007 | Kim |
| 2008/0101656 | A1 | 5/2008 | Barnes |
| 2008/0180436 | A1 | 7/2008 | Kraver |
| 2009/0289957 | A1 | 11/2009 | Sroka |
| 2010/0111370 | A1 | 5/2010 | Black |
| 2010/0251101 | A1 | 9/2010 | Haussecker |
| 2011/0218825 | A1 | 9/2011 | Hertenstein |
| 2013/0297353 | A1 | 11/2013 | Strange |
| 2014/0119604 | A1 | 5/2014 | Mai |
| 2014/0172245 | A1 | 6/2014 | Soles |
| 2015/0029304 | A1 | 1/2015 | Park |
| 2015/0097931 | A1 | 4/2015 | Hatzilias |
| 2015/0103170 | A1 | 4/2015 | Nelson |
| 2015/0125049 | A1 | 5/2015 | Taigman |
| 2015/0278987 | A1 | 10/2015 | Mihara |
| 2015/0317527 | A1 | 11/2015 | Graumann |
| 2015/0347845 | A1 | 12/2015 | Benson |
| 2015/0365661 | A1 | 12/2015 | Hayashi |
| 2016/0035096 | A1 | 2/2016 | Rudow |
| 2017/0109930 | A1 | 4/2017 | Holzer |
| 2017/0199647 | A1 | 7/2017 | Richman |
| 2017/0208246 | A1 | 7/2017 | Kimura |
| 2017/0277363 | A1 | 9/2017 | Holzer |
| 2017/0293894 | A1 | 10/2017 | Taliwal |
| 2018/0027178 | A1 | 1/2018 | MacMillan |
| 2018/0160102 | A1 | 6/2018 | Luo |
| 2018/0190017 | A1 | 7/2018 | Mendez |
| 2018/0225858 | A1 | 8/2018 | Ni |
| 2018/0260793 | A1 | 9/2018 | Li |
| 2018/0293552 | A1 | 10/2018 | Zhang |
| 2018/0315260 | A1 | 11/2018 | Anthony |
| 2018/0322623 | A1 | 11/2018 | Memo |
| 2018/0338126 | A1 | 11/2018 | Trevor |
| 2018/0349746 | A1 | 12/2018 | Vallespi-Gonzalez |
| 2019/0012394 | A1 | 1/2019 | Endras |
| 2019/0035165 | A1 | 1/2019 | Gausebeck |
| 2019/0066304 | A1 | 2/2019 | Hirano |
| 2019/0073641 | A1 | 3/2019 | Utke |
| 2019/0098277 | A1 | 3/2019 | Takama |
| 2019/0116322 | A1 | 4/2019 | Holzer |
| 2019/0147221 | A1 | 5/2019 | Grabner |
| 2019/0147583 | A1 | 5/2019 | Stefan |
| 2019/0164301 | A1 | 5/2019 | Kim |
| 2019/0189007 | A1 | 6/2019 | Herman |
| 2019/0196698 | A1 | 6/2019 | Cohen |
| 2019/0197196 | A1 | 6/2019 | Yang |
| 2019/0205086 | A1 | 7/2019 | McNulty |
| 2019/0317519 | A1 | 10/2019 | Chen |
| 2019/0318759 | A1 | 10/2019 | Doshi |
| 2019/0335156 | A1 | 10/2019 | Rusu |
| 2019/0349571 | A1 | 11/2019 | Herman |
| 2019/0392569 | A1 | 12/2019 | Finch |
| 2020/0111201 | A1* | 4/2020 | Kuruvilla .............. G06T 7/0002 |
| 2020/0118342 | A1 | 4/2020 | Varshney |
| 2020/0151860 | A1 | 5/2020 | Safdarnejad |
| 2020/0231286 | A1 | 7/2020 | Movsesian |
| 2020/0233892 | A1 | 7/2020 | Calhoun |
| 2020/0234397 | A1 | 7/2020 | Holzer |
| 2020/0234398 | A1 | 7/2020 | Holzer |
| 2020/0234424 | A1 | 7/2020 | Holzer |
| 2020/0234451 | A1 | 7/2020 | Holzer |
| 2020/0234488 | A1 | 7/2020 | Holzer |
| 2020/0236296 | A1 | 7/2020 | Holzer |
| 2020/0236343 | A1 | 7/2020 | Holzer |
| 2020/0257862 | A1 | 8/2020 | Kar |
| 2020/0258309 | A1 | 8/2020 | Holzer |
| 2020/0312028 | A1 | 10/2020 | Charvat |
| 2020/0322546 | A1 | 10/2020 | Carolus |
| 2020/0349757 | A1 | 11/2020 | Holzer |

FOREIGN PATENT DOCUMENTS

| | | |
|---|---|---|
| WO | 2017115149 A1 | 7/2017 |
| WO | 2017195228 A1 | 11/2017 |
| WO | 2019229912 | 12/2019 |
| WO | 2020009948 A1 | 1/2020 |
| WO | 2020125726 | 6/2020 |
| WO | 2020154096 A1 | 7/2020 |

OTHER PUBLICATIONS

Zhao, Jian. "Applying digital watermarking techniques to online multimedia commerce." Proc. Int. Conf. on Imaging Science, Systems and Applications (CISSA'97). vol. 7. 1997. (Year: 1997).*
Abd-Eldayem, Mohamed M. "A proposed security technique based on watermarking and encryption for digital imaging and communications in medicine." Egyptian Informatics Journal 14.1 (2013): 1-13. (Year: 2013).*
Aparna, Puvvadi, and Polurie Venkata Vijay Kishore. "A blind medical image watermarking for secure e-healthcare application using crypto-watermarking system." Journal of Intelligent Systems 29.1 (2019): 1558-1575. (Year: 2019).*
Office Action (Notice of Allowance and Fees Due (PTOL-85)) dated Apr. 7, 2022 for U.S. Appl. No. 17/215,596 (pp. 1-9).
Office Action (Final Rejection) dated Apr. 19, 2022 for U.S. Appl. No. 16/692,219 (pp. 1-13).
Office Action (Non-Final Rejection) dated Apr. 14, 2022 for U.S. Appl. No. 17/144,879 (pp. 1-12).
Office Action (Non-Final Rejection) dated Sep. 20, 2021 for U.S. Appl. No. 16/861,100 (pp. 1-19).
Office Action (Final Rejection) dated Jan. 19, 2022 for U.S. Appl. No. 16/861,100 (pp. 1-19).
Office Action dated Jul. 26, 2021 for U.S. Appl. No. 16/518,558 (pp. 1-17).
International Search Report and Written Opinion for App. No. PCT/US2021/013431, dated May 6, 2021, 10 pages.
Office Action (Final Rejection) dated Nov. 9, 2021 for U.S. Appl. No. 16/518,558 (pp. 1-17).
Office Action (Non-Final Rejection) dated Mar. 29, 2022 for U.S. Appl. No. 16/518,558 (pp. 1-16).
Int'l Application Serial No. PCT/US20/12592, Int'l Search Report and Written Opinion dated Apr. 21, 2020. 9 pages.

(56) References Cited

OTHER PUBLICATIONS

Alberto Chavez-Aragon, et al., "Vision-Based Detection and Labelling of Multiple Vehicle Parts", 2011 14th International IEEE Conference on Intelligent Transportation Systems Washington, DC, USA. Oct. 5-7, 2011, 6 pages.
Wenhao Lu, et al., "Parsing Semantic Parts of Cars Using Graphical Models and Segment Appearance Consistency", arXiv:1406.2375v2 [cs.CV] Jun. 11, 2014, 12 pages.
Riza Alp Guler et al., "DensePose: Dense Human Pose Estimation In The Wild", arXiv:1802.00434v1 [cs.CV] Feb. 1, 2018, 12 pages.
Gerd Lindner et al., "Structure-Preserving Sparsification of Social Networks", arXiv:1505.00564vl [cs.SI] May 4, 2015, 8 pages.
Shubham Tulsiani and Jitendra Malik, "Viewpoints and Keypoints", arXiv:1411.6067v2 [cs.CV] Apr. 26, 2015, 10 pages.
Jeff Donahue et al., "DeCAF: ADeep Convolutional Activation Feature for Generic Visual Recognition", arXiv: 1310.153 vl [cs.CV] Oct. 6, 2013, 10 pages.
International Search Report and Written Opinion for App. No. PCT/US2021/013471, dated May 6, 2021, 10 pages.
International Search Report and Written Opinion for App. No. PCT/US2021/013472, dated May 11, 2021, 10 pages.
Office Action dated May 18, 2021 for U.S. Appl. No. 16/692,219 (pp. 1-13).
Office Action dated Jun. 14, 2021 for U.S. Appl. No. 16/518,570 (pp. 1-24).
Office Action dated Jul. 16, 2021 for U.S. Appl. No. 16/518,501 (pp. 1-23).
U.S. Appl. No. 16/518,501, CTFR—Final Rejection, Dec. 9, 2020, 16 pgs.
U.S. Appl. No. 16/518,501, Non-Final Rejection, Sep. 1, 2020, 15 pgs.
U.S. Appl. No. 16/518,501, Examiner Interview Summary Record (Ptol-413), Nov. 23, 2020, 2 pgs.
U.S. Appl. No. 16/518,512, Non-Final Rejection, Oct. 1, 2020, 24 pgs.
U.S. Appl. No. 16/518,512, Examiner Interview Summary Record (Ptol-413), Nov. 19, 2020, 3 pgs.
U.S. Appl. No. 16/518,512, Office Action Appendix, Nov. 19, 2020, 1 pg.
U.S. Appl. No. 16/518,558, Non-Final Rejection, Sep. 8, 2020, 14 pgs.
U.S. Appl. No. 16/518,585, Non-Final Rejection, Sep. 3, 2020, 13 pgs.
U.S. Appl. No. 16/596,516, Non-Final Rejection, Jun. 23, 2020, 37 pgs.
U.S. Appl. No. 16/596,516, Notice Of Allowance And Fees Due (Ptol-85), Sep. 21, 2020, 10 pgs.
U.S. Appl. No. 16/692,133, Non-Final Rejection, Jul. 24, 2020, 17 pgs.
U.S. Appl. No. 16/692,170, Non-Final Rejection, Nov. 20, 2020, 13 pgs.
U.S. Appl. No. 16/692,219, Non-Final Rejection, Dec. 8, 2020, 9 pgs.
U.S. Appl. No. 16/861,100, Non-Final Rejection, Oct. 8, 2020, 11 pgs.
U.S. Appl. No. 16/518,512, Notice of Allowance mailed Jan. 25, 2021, 7 pgs.
U.S. Appl. No. 16/518,512, Notice of Allowance mailed Dec. 16, 2020, 9 pgs.
U.S. Appl. No. 16/518,558, Examiner Interview Summary mailed Dec. 16, 2020, 1 pg.
U.S. Appl. No. 16/518,558, Final Office Action mailed Dec. 16, 2020, 16 pgs.
U.S. Appl. No. 16/518,570, Non-Final Office Action mailed Jan. 6, 2021, 17 pgs.
U.S. Appl. No. 16/518,585, Notice of Allowance mailed Dec. 14, 2020, 5 pgs.
U.S. Appl. No. 16/692,133, Notice of Allowance mailed Dec. 15, 2020, 7pgs.
U.S. Appl. No. 16/692,170, Notice of Allowance mailed Feb. 9, 2021, 8 pgs.
U.S. Appl. No. 16/861,100, Advisory Action mailed Jun. 10, 2021, 3 pgs.
U.S. Appl. No. 16/861,100, Examiner Interview Summary mailed Feb. 10, 2021, 2 pgs.
U.S. Appl. No. 16/861,100, Examiner Interview Summary mailed Jun. 10, 2021, 1 pg.
U.S. Appl. No.16/861,100, Examiner Interview Summary mailed Jun. 3, 2021, 2 pgs.
U.S. Appl. No. 16/861,100, Final Office Action mailed Feb. 26, 2021, 15 pgs.
Office Action (Final Rejection) dated Jun. 14, 2021 for U.S. Appl. No. 16/518,570 (pp. 1-23).
Office Action (Non-Final Rejection) dated Sep. 2, 2021 for U.S. Appl. No. 17/174,250 (pp. 1-22).
Office Action (Notice of Allowance and Fees Due (PTOL-85)) dated Sep. 15, 2021 for U.S. Appl. No. 16/518,570 (pp. 1-8).
Office Action (Non-Final Rejection) dated Sep. 24, 2021 for U.S. Appl. No. 17/215,596 (pp. 1-14).
Office Action (Non-Final Rejection) dated Oct. 4, 2021 for U.S. Appl. No. 16/861,097 (pp. 1-15).
Office Action (Non-Final Rejection) dated Dec. 7, 2021 for U.S. Appl. No. 16/692,219 (pp. 1-12).
Office Action (Final Rejection) dated Dec. 7, 2021 for U.S. Appl. No. 16/518,501 (pp. 1-21).
Office Action (Final Rejection) dated Jan. 20, 2022 for U.S. Appl. No. 17/215,596 (pp. 1-16).
Office Action (Final Rejection) dated Jan. 19, 2022 for U.S. Appl. No. 16/861,097 (pp. 1-16).
Office Action (Final Rejection) dated Mar. 3, 2022 for U.S. Appl. No. 17/174,250 (pp. 1-24).
Office Action (Non-Final Rejection) dated Mar. 28, 2022 for U.S. Appl. No. 16/518,501 (pp. 1-21).
Office Action (Non-Final Rejection) dated Jun. 15, 2022 for U.S. Appl. No. 16/861,097 (pp. 1-17).
Office Action (Non-Final Rejection) dated Jun. 15, 2022 for U.S. Appl. No. 16/861,100 (pp. 1-18).
Office Action (Non-Final Rejection) dated Jul. 22, 2022 for U.S. Appl. No. 17/351,124 (pp. 1-12).
Office Action dated Jun. 15, 2022 for U.S. Appl. No. 17/190,268 (pp. 1-17).
Giegerich, et al., "Automated Classification of "Bad Images" by Means of Machine Learning for Improved Analysis of Vehicle Undercarriages," TechConnect Briefs 2022, pp. 1-4.
Green, et al., "Vehicle Underscarriage Scanning for use in Crash Reconstruction," FARO White Paper, 2015, 5 pages.
IVUS Intelligent Vehicle Undercarriage Scanner Brochusre, GatekeeperSecurity.com, 2 pages.
Kiong, Frederick Chong Chuen, "Vehicle Undercarriage Scanning System," A disseration for ENG 4111 and ENG 4112 Research Project, University of Southern Queensland (USQ), Oct. 27, 2005, 163 pages.
Office Action (Final Rejection) dated Aug. 31, 2022 for U.S. Appl. No. 17/144,879 (pp. 1-14).
Office Action (Final Rejection) dated Nov. 14, 2022 for U.S. Appl. No. 16/861,097 (pp. 1-19).
Office Action (Final Rejection) dated Nov. 14, 2022 for U.S. Appl. No. 16/861,100 (pp. 1-19).
Office Action (Notice of Allowance and Fees Due (PTOL-85)) dated Sep. 19, 2022 for U.S. Appl. No. 17/144,885 (pp. 1-7).
Office Action (Notice of Allowance and Fees Due (PTOL-85)) dated Nov. 15, 2022 for U.S. Appl. No. 17/190,268 (pp. 1-7).
Extended European Search Report issued in App. No. EP20744281.5, dated Aug. 12, 2022, 7 pages.
Office Action (Final Rejection) dated Aug. 12, 2022 for U.S. Appl. No. 16/518,501 (pp. 1-21).
Office Action (Final Rejection) dated Aug. 12, 2022 for U.S. Appl. No. 16/518,558 (pp. 1-18).
Office Action (Non-Final Rejection) dated Aug. 18, 2022 for U.S. Appl. No. 17/174,250 (pp. 1-17).

(56) References Cited

OTHER PUBLICATIONS

Office Action (Notice of Allowance and Fees Due (PTOL-85)) dated Aug. 17, 2022 for U.S. Appl. No. 16/692,219 (pp. 1-7).

* cited by examiner

MULTIVIEW INTERACTIVE DIGITAL MEDIA REPRESENTATION INVENTORY VERIFICATION

CROSS-REFERENCE TO RELATED APPLICATIONS

The present application claims priority under 35 U.S.C. 120 to U.S. Provisional Patent Application No. 62/879,859, titled "MULTIVIEW INTERACTIVE DIGITAL MEDIA REPRESENTATION INVENTORY VERIFICATION OBJECT CAPTURE COVERAGE EVALUATION", filed Jul. 29, 2019, by Holzer et al., which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the processing of visual digital media content, and more specifically to multiview interactive digital media representations.

DESCRIPTION OF RELATED ART

Inventory verification is typically a manual and time-consuming process in which a trusted human checks a set of physical inventory items against a record of items that are believed to be. For example, many vehicle dealerships stock their inventory with vehicles purchased on borrowed funds. In such a situation, the lenders would like to regularly audit the inventory to verify that the purchased vehicles are still in the possession of the dealership and that they remain in the expected condition.

Using conventional techniques, inventory verification in the vehicle context requires a time-intensive and cost-intensive procedure in which a person physically travels to a location such as a vehicle dealership and verifies the presence and condition of each vehicle. Further, in some cases a vehicle is not physically present at the dealership for legitimate reasons when the verifying individual is on site, for instance due to being on a test drive, limiting the effectiveness of existing manual verification techniques.
Overview Provided are various techniques, mechanisms, and processes relating to the processing of visual media data. According to various embodiments, a camera may be operable to capture an image of object verification information uniquely identifying an object in physical proximity to the client machine. A communication interface may be operable to transmit the object identification to a remote server and to receive from the server a security key associated with the object. A processor may be operable to generate a multi-view interactive digital media representation (MVIDMR). The MVIDMR may include a plurality of images of the object captured via the camera each from a respective viewpoint. The viewpoints may correspond to the movement of the computing device through space in proximity to the object. The MVIDMR may include the security key. The MVIDMR may be transmitted to the remote verification server via the communication interface. A display screen may be configured to display the MVIDMR, which may be navigable in one or more dimensions.

In some embodiments, inertial measurement unit (IMU) data may be captured from an IMU located within the client machine. The IMU may include one or more accelerometers, and the IMU data may include information characterizing acceleration of the client machine through space during various periods of time. The MVIDMR may be generated in part based on the IMU data. Generating the MVIDMR may involve positioning the images with respect to each other based in part on the IMU data. The communication interface may be operable to transmit geolocation information to the verification server. The geolocation information may include global positioning system (GPS) coordinates. The movement of the computing device through space may comprise a 360-degree arc around the object.

In some implementations, generating the MVIDMR may involve identifying a plurality of key points associated with the object. For each of the images, respective locations for one or more of the key points in the image may be determined. The images may be positioned with respect to each other based in part on the key point locations. The object may be a vehicle, and the object identification information may comprise a vehicle identification number (VIN). Transmitting the object identification information may involve transmitting a picture of a VIN plate on a vehicle dashboard.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods and computer program products for processing visual data. These drawings in no way limit any changes in form and detail that may be made by one skilled in the art without departing from the spirit and scope of the disclosed implementations.

DETAILED DESCRIPTION

Techniques and mechanisms described herein facilitate a verification system that provides a simple experience for inventory verification. In some embodiments, a person may operate a verification application installed on a smartphone running an operation system such as iOS or Android. The person may use the application to capture information about physical inventory item or items. The application may communicate with a remote server to confirm the presence and condition of the physical inventory items.

In some implementations, the system may provide one or more advantages. For example, the system may allow an untrusted individual such as an employee at a vehicle dealership to capture information used to verify inventory. As another example, the verifying party may be provided with a more secure and improved verification process that does not require the verifying party to send a trusted individual to inspect the physical inventory. As yet another example, inventory verification costs may be substantially decreased, leading to significant savings for the verifying party.

According to various embodiments, the system may provide one or more security benefits. First, geolocation data may identify the physical location of the verified inventory item. Second, watermarked and/or three-dimensional multi-view capture may ensure that the inventory item exists and is not two-dimensional image. Third, a security key may ensure accurate time information that characterizes when the inventory item was verified.

In some implementations, an inventory verification procedure may involve capturing one or more scans of an inventory item via a mobile computing device. The scans may include one or more three-dimensional (3D) components. For example, a person may capture video or images of the inventory item from one or more viewpoints, for instance by walking around the item while using a camera in a smartphone. The scans may also include information about an identifier associated with the inventory item. For example, in the case of a vehicle the vehicle identification number (VIN) may be scanned. Such information may be uploaded to a remote server from the mobile computing device. The remote server may then use the information to confirm the status of the inventory item.

Figure 1:
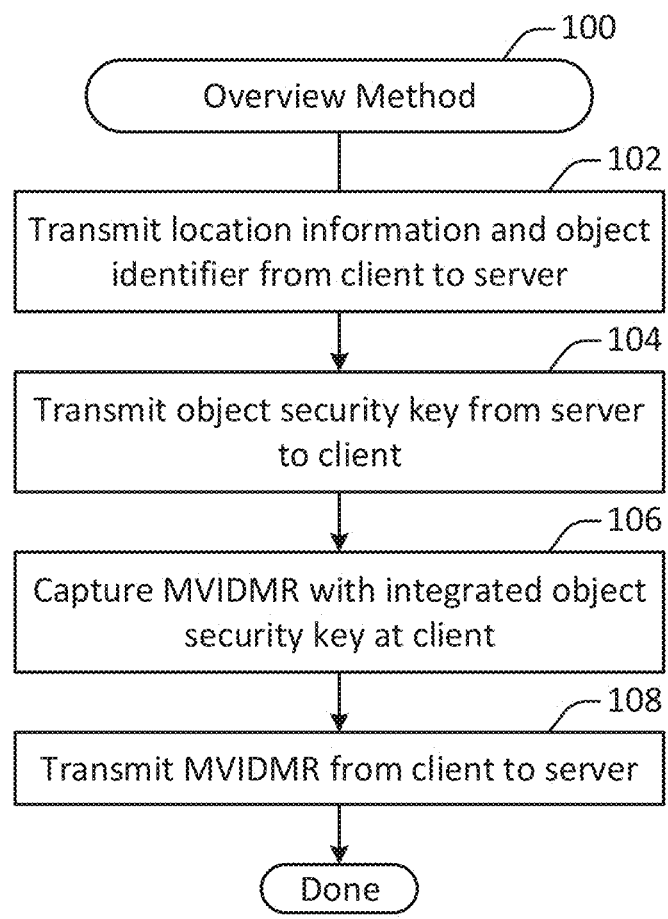
FIG. 1 illustrates an example of an inventory verification overview method.

FIG. 1 illustrates an example of an inventory verification overview method 100, performance in accordance with one or more embodiments. The method 100 may be performed at a system that includes a client machine in communication with a verification server. The client machine may be a mobile computing device such as a smartphone.

Location information and an object identifier are transmitted from a client machine to a server at 102. According to various embodiments, the location information may be determined by, for example, a global positioning system (GPS) unit at a mobile computing device such as a smart phone. The location information may be used to ensure that the server is communicating with a device located near where the object is supposed to be located. The object identifier may be any suitable information for identifying an object. For example, the object identifier may be a VIN, which may be entered and transmitted as text or may be entered and transmitted as an image of a vehicle's VIN plate (e.g., on the dashboard).

An object security key is transmitted from the server to the client machine at 104. According to various embodiments, the object security key may be provided to ensure that the multi-view interactive digital media representation (MVIDMR) transmitted to the server at the time of verification was generated at that time and not at an earlier point in time. Accordingly, any suitable object security key may be employed.

An MVIDMR with the object security key integrated is captured at 106. According to various embodiments, the MVIDMR may include different images of the object captured from different viewpoints. The images may be linked together to allow them to be navigated in one or more dimensions. For example, key points in the object may be identified in each image. The images may then be positioned relative to one another based on the keypoints, to allow a user to navigate around the object for instance in a 360-degree arc. As part of the generation of the MVIDMR, the client machine may incorporate the object security key sent from the server. As part of the generation of the MVIDMR, the computing device may also determine and incorporate inertial measurement unit (IMU) data, for instance to facilitate linking the different images. Capturing this IMU information also helps to ensure that the subject of the MVIDMR is the object itself, and not images of the object.

The MVIDMR is transmitted from the client to the server at 108. According to various embodiments, upon receipt of the MVIDMR the server has the information necessary to verify: (1) that the device is located where the object is supposed to be located; (2) that the MVIDMR is capturing the actual three-dimensional object rather than images of the object; and (3) that the MVIDMR is generated in the time period between when the object security key is sent and the time when the MVIDMR is received. Collectively these facts allow the server to confirm with a high degree of confidence that the object is located where it is supposed to be located at the time of verification.

Figure 2:
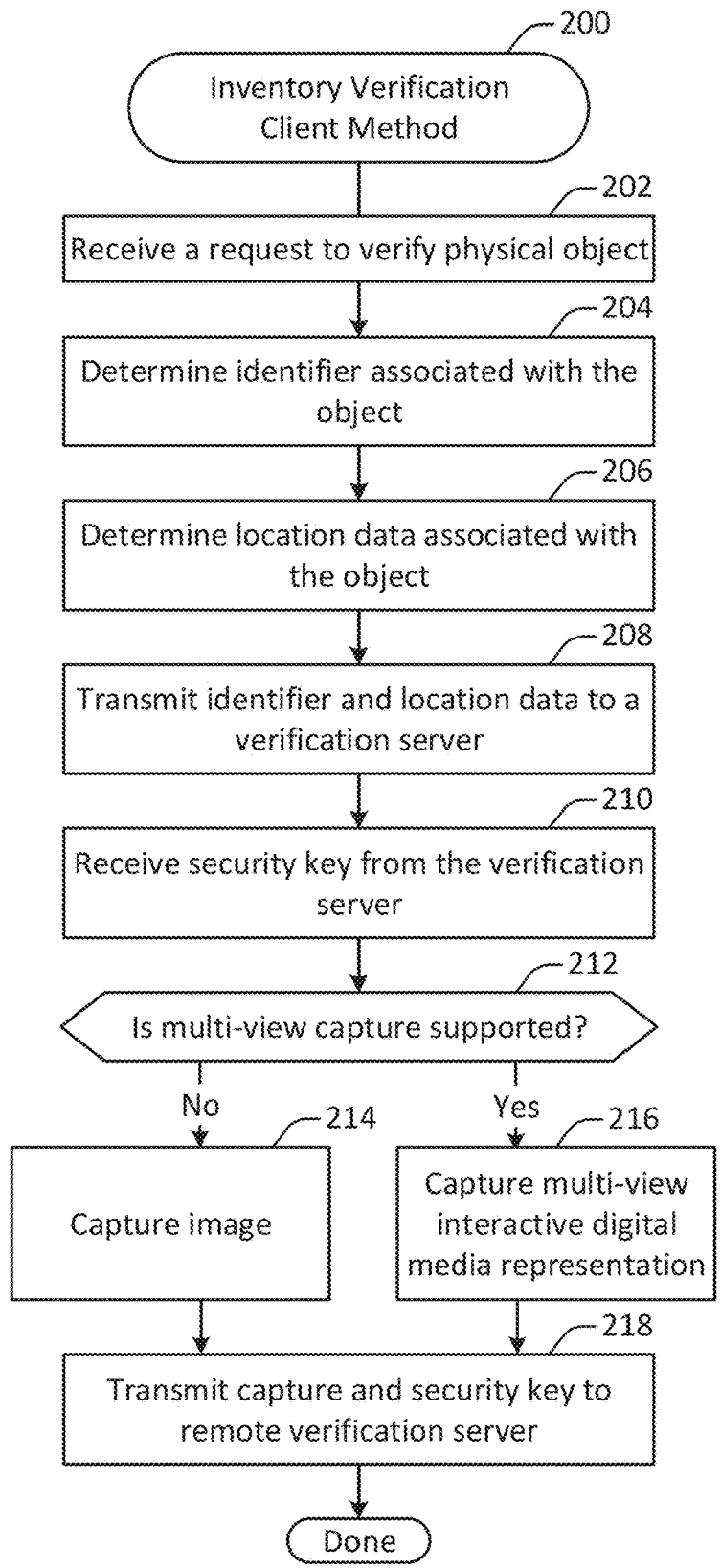
FIG. 2 illustrates an example of a client method for inventory verification.

FIG. 2 illustrates a method 200 for performing inventory verification at a client machine. According to various embodiments, the method 200 may be performed at a client machine such as a smartphone in communication with a remote verification server.

At 202, a request is received to verify a physical object. According to various embodiments, the request may be generated based on user input. For example, a user at the client machine may initiate a request to verify an object. Alternately, or additionally, the request may be generated at least in part based on an automated process. For example, the client machine may perform a process to verify a series of objects in sequence.

In particular embodiments, the client machine may automatically initiate verification when the client machine determines that a condition has been met. For instance, the client machine may automatically initiate verification of an object when the client machine determines that it is in proximity to an object, such as via RFID tracking.

At 204, an identifier associated with the object is determined. According to various embodiments, the identifier may be determined in any of various ways. For example, the client machine may capture an image of an identifier affixed to the object, such as a VIN placed on the dashboard of a vehicle. As another example, the client machine may determine an identifier based on communicating with the object, such as by reading an RFID signal.

At 206, location data associated with the object is determined. In some implementations, the location data may be determined via any suitable technique. For example, a geolocation system such as a global position system (GPS) on the client device may be used to determine the device's location. As another example, network location information such as cell phone signal triangulation may be used to identify a location of the client device.

At 208, identifier and location data may be transmitted to a verification server. According to various embodiments, the location data may include GPS coordinates, a network identifier, or any other suitable data.

In particular embodiments, additional information may be sent. For instance, the client machine may capture an image of a vehicle odometer or other such object features.

At 210, a security key is received from the verification server. According to various embodiments, the security key may be a randomly generated value.

A determination is made at 212 as to whether the client supports the capture of multiview interactive digital media representations (MVIDMRs). If not, then one or more two-dimensional images may be captured at 214. In some implementations, a watermark may be applied to such images. For instance, the watermark may be based on the security key.

If instead multi-view capture is supported, then a MVIDMR is captured at 216. Techniques for capturing a MVIDMR are described throughout the application as filed, such as with respect to FIGS. 3 through 25.

According to various embodiments, the MVIDMR may be generated by a trusted application at the client machine. The generation of the MVIDMR may involve capturing data such as inertial measurement unit (IMU) data, geolocation data (e.g., GPS data), timestamp data, and other such information.

In some implementations, live pose estimation may be used during the capture process to ensure that a real object is captured rather than, for instance, a two-dimensional image. Live pose estimation may involve using a combination of IMU data and image data to determine the pose of the object relative to the camera as the camera moves through space relative to the object.

According to various embodiments, IMU information may be used to verify that the mobile computing device capturing the object is moving in a reasonable manner during the capture of the object. For example, if an actual object such as a vehicle were being captured from different viewpoints, then the mobile device would be moving in, for instance, an arc around the object. This movement would be reflected in the IMU data captured at the mobile device. If instead the mobile device were capturing or transmitting 2D images captured at an earlier point in time, the mobile device may be positioned in a fixed location and thus not indicating suitable acceleration and/or rotation via the IMU data.

In particular embodiments, a user may be asked to move the mobile device in a specific motion pattern or to specific viewpoints in real time. Such a motion pattern may be included in the communication from the server in which the security key is transmitted. Requesting a user to move the mobile device in a specific motion pattern may ensure that the capture is done at the time of the request and is not conveying a pre-captured sequence of images.

In some implementations, the security key and/or a digital watermark may be used to generate the MVIDMR. For instance, the security key and/or digital watermark may be applied during the generation of the MVIDMR in a manner that is later recoverable at the server.

The capture information and the security key are sent to the remote verification server at 218. In some embodiments, the capture information may include any of the information captured at 214 and 216. Such information may include, but is not limited to, one or more of an MVIDMR, timestamp data, geolocation data, security key information, a two-dimensional images, a three-dimensional model, and IMU data.

In particular embodiments, the capture of visual data, for instance as discussed with respect to the method 200 shown in FIG. 2, may be performed in a single continuous recording. For instance, if visual data is captured during a single recording with the camera on continuously and the object being visible during the entire recording, the system may better ensure accurate verification. For example, such an approach may help to avoid mixing images of different cars to hide damage. As another example, such an approach may help to avoid capturing a single picture of a VIN plate and then imaging a similar car. In such configurations, visual data may be captured either before, after, or during the transmission of information to the remote verification server.

Figure 3:
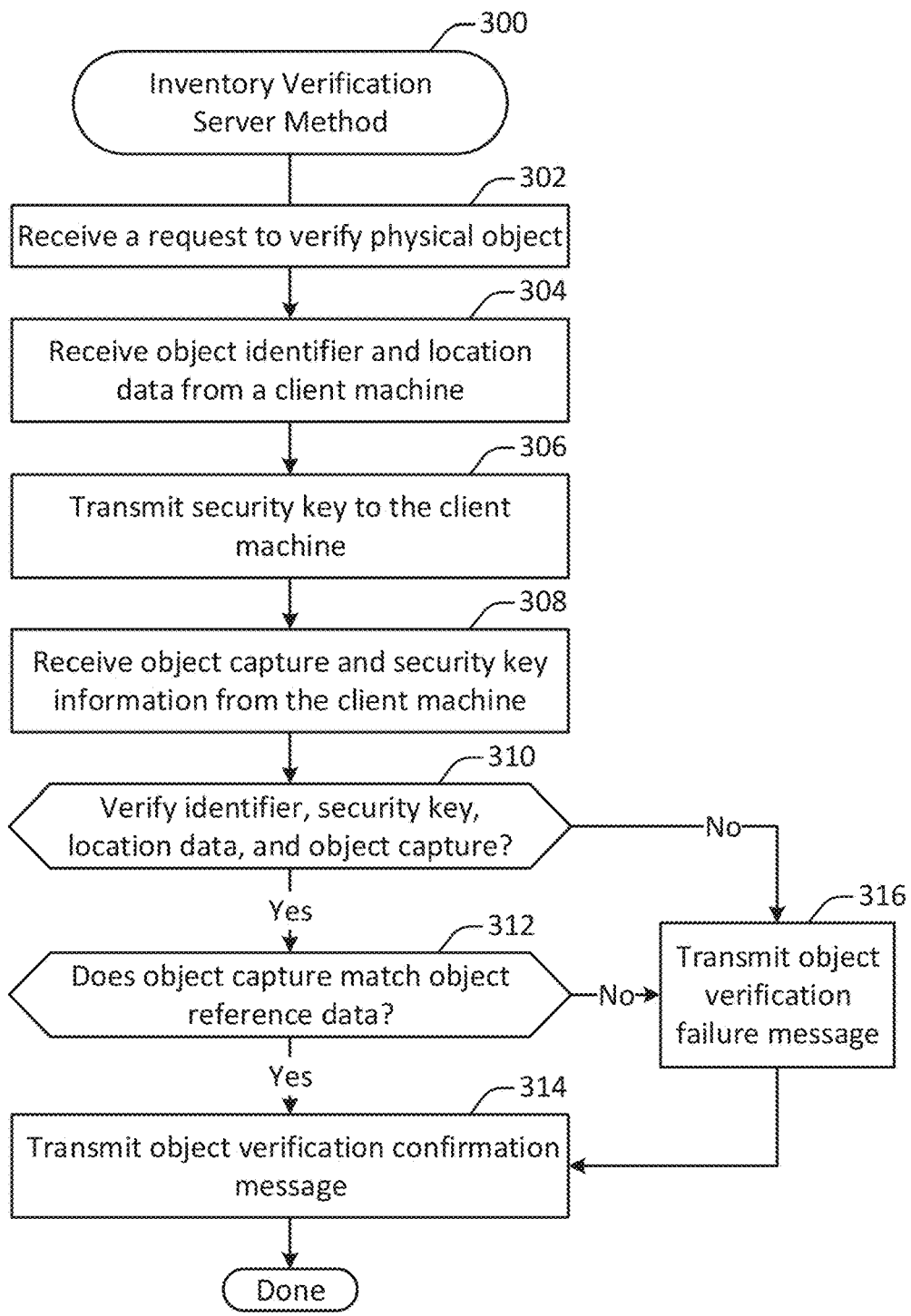
FIG. 3 illustrates an example of a server method for inventory verification.

FIG. 3 illustrates a method 300 for performing inventory verification at a server. According to various embodiments, the method 300 may be performed at a verification server in communication with a remote client machine.

At 302, a request is received to verify a physical object. According to various embodiments, the request may be generated based on communication with a client machine. For example, the client machine may transmit an object identifier as part of a request to identify the object. As another example, the client machine and server may establish a communication session for the purposes of verifying one or more objects.

At 304, identifier and location data are received from the client machine. According to various embodiments, the identifier and location data may correspond to the information transmitted at operation 208 in FIG. 3.

A security key is transmitted to the client machine at 306. In some implementations, the security key may be a randomly generated value. Alternately, or additionally, the security key may be generated as part of cryptographic protocol involving the client machine and the verification server. The security key may be stored at the server in association with the identifier and location data for later verification.

Object capture and security key information is received from the client machine at 308. In some implementations, the object capture information may correspond to the information transmitted at operation 218 shown in FIG. 3.

At 310, a determination is made as to whether the identifier, security key, location data, and object capture information match. For example, the object capture may include an object identifier, which may be used to identify the appropriate security key transmitted to the client machine at 306. As another example, the security key transmitted to the client machine at 306 may be compared with the security key information received from the client machine at 308 to ensure that they match. As yet another example, the object capture information may include location data, which may also be compared with the location data received at 304 to ensure that they match.

In particular embodiments, some or all of the verified information may be embedded in the object capture. For example, the security key, location data, and/or object identifier may be included in an MVIDMR, for instance via watermarking.

In particular embodiments, the object capture information may be used to verify some or all of the security key, location data, and/or object identifier information. For example, an MVIDMR may be associated with IMU data captured by sensors at the client machine during the capture of the images associated with the MVIDMR. The IMU data may be compared with the MVIDMR to ensure that the detected sensor readings match the progression of images between viewpoints.

In some implementations, the determination made at operation 310 may involve evaluating whether the object is located at an acceptable place, and/or that the verification was performed at an appropriate time. For example, in the case of a vehicle, the system may determine whether the vehicle is present at the premises of a dealership at a designated time, such as during normal business hours.

At 312, a determination is made as to whether the object capture matches object reference data. In some implementations, the determination may involve creating a 3D reconstruction of the object at the server. The constructed 3D model may then be compared with a reference model.

In some embodiments, the determination may involve performing object recognition on one or more images included in the object capture information. The object recognition may categorize the object type, color, shape, and/or other attributes, which may then be compared with reference data about the object.

In particular embodiments, the determination made at operation 312 may involve verifying a vehicle. For example, a security key may be associated with a VIN, and an MVIDMR may be used to ensure that the vehicle associated with the security key is physically present at an approved location at a particular point in time.

In particular embodiments, the determination made at operation 312 may involve detecting damage to the object. For example, a damage detection procedure may be performed on the object capture data. Such a procedure may be able to detect, for instance, scrapes or dents on a vehicle that are not present in the reference data.

If it is determined that the object capture matches the object reference data, then at 314 an object verification confirmation message is transmitted. If instead the information sent from the client machine is not verified, then at 316 an object verification failure message is transmitted. According to various embodiments, transmitting an object verification success or failure message may involve storing data in a database, transmitting information to the client machine, and/or transmitting information to another location via a network. For example, an interested party associated with the object may receive an email or other such message.

Various embodiments described herein relate generally to systems and methods for analyzing the spatial relationship between multiple images and video together with location information data, for the purpose of creating a single representation, a MVIDMR, which eliminates redundancy in the data, and presents a user with an interactive and immersive active viewing experience. According to various embodiments, active is described in the context of providing a user with the ability to control the viewpoint of the visual information displayed on a screen.

In particular example embodiments, augmented reality (AR) is used to aid a user in capturing the multiple images used in a MVIDMR. For example, a virtual guide can be inserted into live image data from a mobile. The virtual guide can help the user guide the mobile device along a desirable path useful for creating the MVIDMR. The virtual guide in the AR images can respond to movements of the mobile device. The movement of mobile device can be determined from a number of different sources, including but not limited to an Inertial Measurement Unit and image data.

Various aspects also relate generally to systems and methods for providing feedback when generating a MVIDMR. For example, object recognition may be used to recognize an object present in a MVIDMR. Then, feedback such as one or more visual indicators may be provided to guide the user in collecting additional MVIDMR data to collect a high-quality MVIDMR of the object. As another example, a target view may be determined for a MVIDMR, such as the terminal point when capturing a 360-degree MVIDMR. Then, feedback such as one or more visual indicators may be provided to guide the user in collecting additional MVIDMR data to reach the target view.

Figure 4:
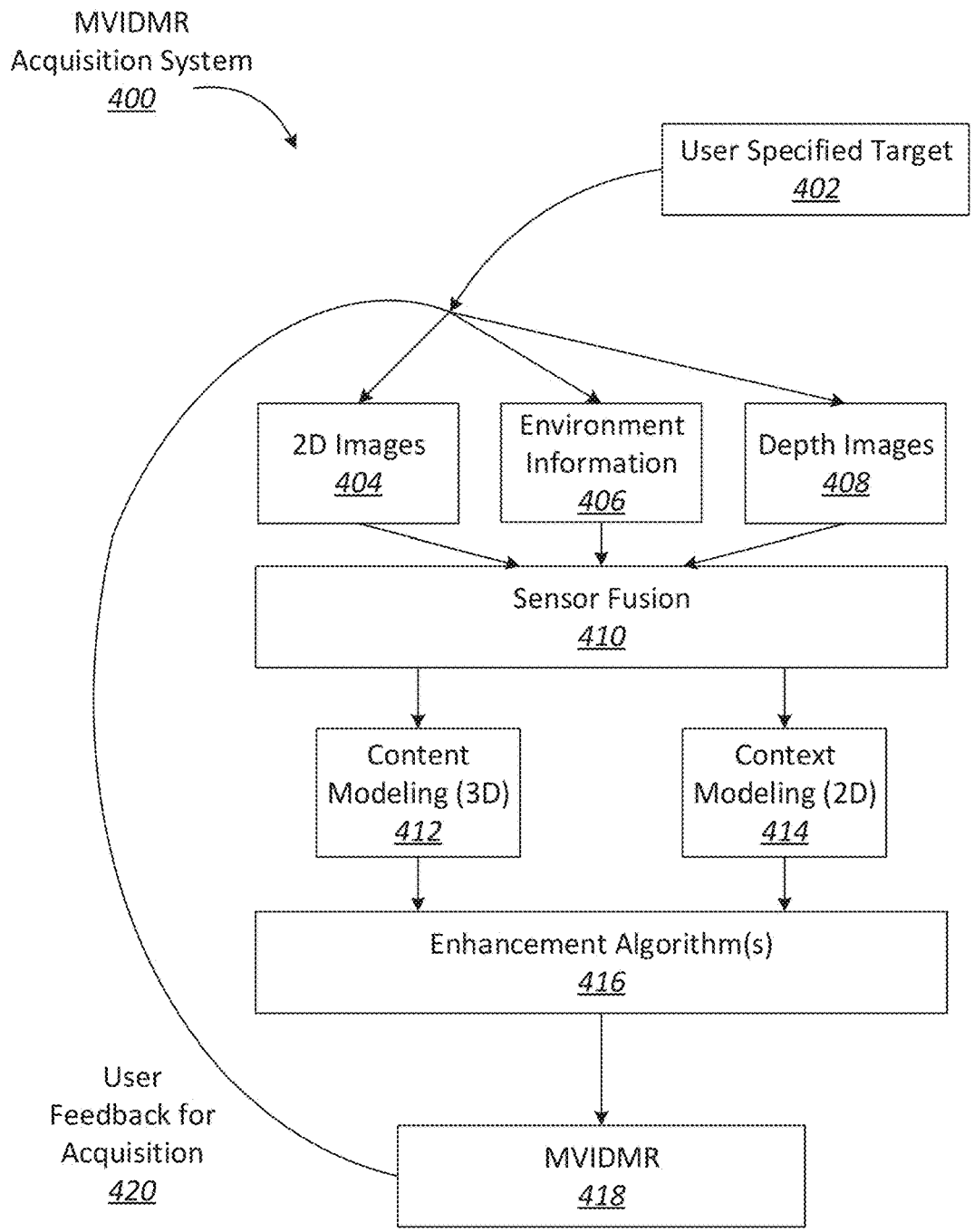
FIG. 4 illustrates an example of a surround view acquisition system.

FIG. 4 shows and example of a MVIDMR acquisition system 400, configured in accordance with one or more embodiments. The MVIDMR acquisition system 400 is depicted in a flow sequence that can be used to generate a MVIDMR. According to various embodiments, the data used to generate a MVIDMR can come from a variety of sources.

In particular, data such as, but not limited to two-dimensional (2D) images 404 can be used to generate a MVIDMR. These 2D images can include color image data streams such as multiple image sequences, video data, etc., or multiple images in any of various formats for images, depending on the application. As described with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 406. This environment information 406 can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images 408. These depth images can include depth, 4D, or disparity image data streams, and the like, and can be captured by devices such as, but not limited to, stereo cameras, time-of-flight cameras, three-dimensional cameras, and the like.

In some embodiments, the data can then be fused together at sensor fusion block 410. In some embodiments, a MVIDMR can be generated a combination of data that includes both 2D images 404 and environment information 406, without any depth images 408 provided. In other embodiments, depth images 408 and environment information 406 can be used together at sensor fusion block 410. Various combinations of image data can be used with environment information at 406, depending on the application and available data.

In some embodiments, the data that has been fused together at sensor fusion block 410 is then used for content modeling 412 and context modeling 414. The subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 412 and context modeling 414 can be generated by combining the image and location information data.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 402 can be chosen, as shown in FIG. 4. It should be noted, however, that a MVIDMR can be generated without a user-specified target in some applications.

In some embodiments, one or more enhancement algorithms can be applied at enhancement algorithm(s) block 416. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur—and overexposure—detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it.

Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 416. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 418 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 4D printing, file sharing, user interaction, and entertainment.

According to various example embodiments, once a MVIDMR 418 is generated, user feedback for acquisition 420 of additional image data can be provided. In particular, if a MVIDMR is determined to need additional views to provide a more accurate model of the content or context, a user may be prompted to provide additional views. Once these additional views are received by the MVIDMR acquisition system 400, these additional views can be processed by the system 400 and incorporated into the MVIDMR.

Figure 5:
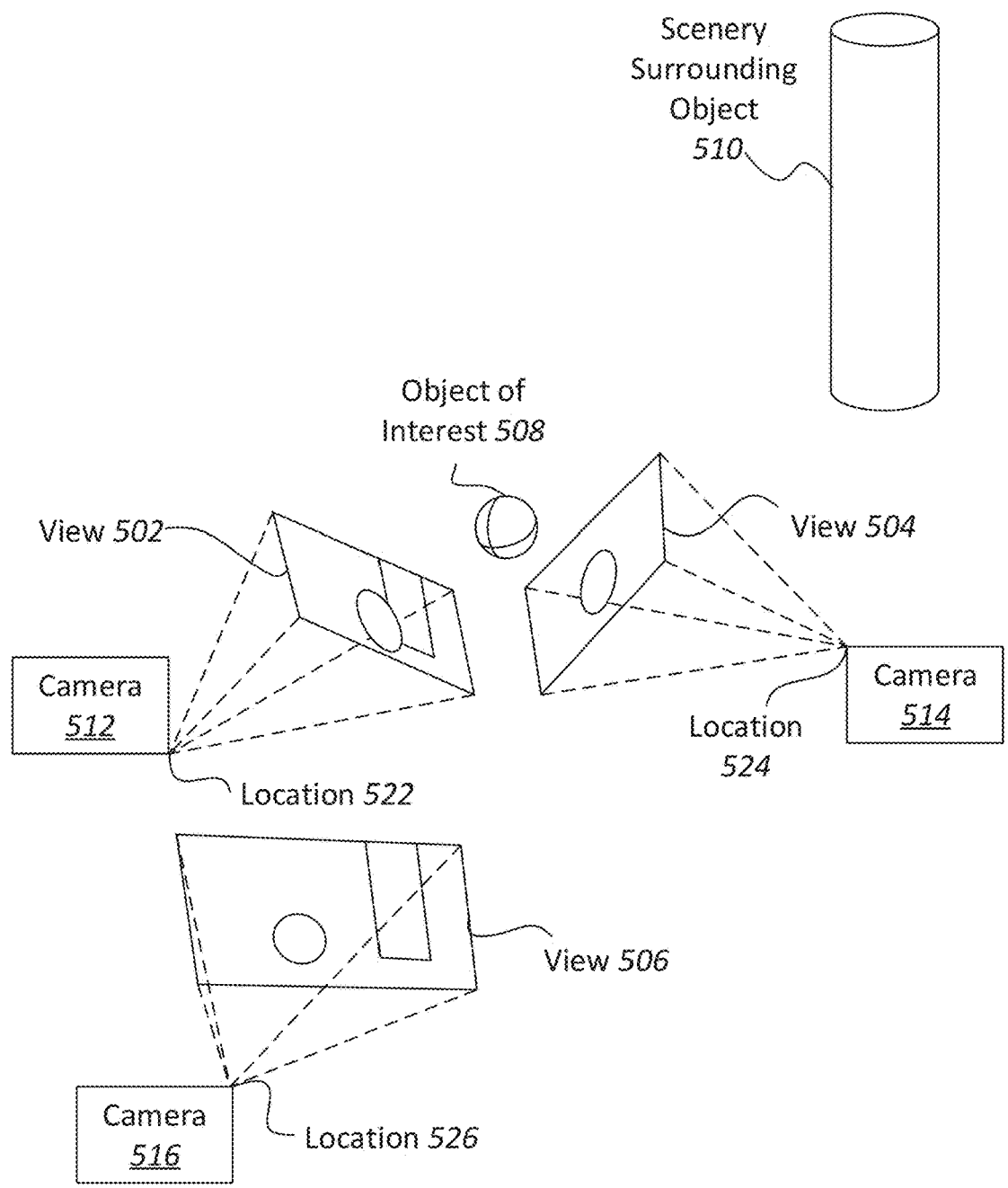
FIG. 5 illustrates one example of multiple camera views that can be fused into a three-dimensional (3D) model to create an immersive experience.

FIG. 5 shows an example of multiple camera views that can be fused together into a three-dimensional (3D) model to create an immersive experience. According to various embodiments, multiple images can be captured from various viewpoints and fused together to provide a MVIDMR. In some embodiments, three cameras 512, 514, and 516 are positioned at locations 522, 524, and 526, respectively, in proximity to an object of interest 508. Scenery can surround the object of interest 508 such as object 510. Views 502, 504, and 506 from their respective cameras 512, 514, and 516 include overlapping subject matter. Specifically, each view 502, 504, and 506 includes the object of interest 508 and varying degrees of visibility of the scenery surrounding the object 510. For instance, view 502 includes a view of the object of interest 508 in front of the cylinder that is part of the scenery surrounding the object 510. View 506 shows the object of interest 508 to one side of the cylinder, and view 504 shows the object of interest without any view of the cylinder.

In some embodiments, the various views 502, 504, and 516 along with their associated locations 522, 524, and 526, respectively, provide a rich source of information about object of interest 508 and the surrounding context that can be used to produce a MVIDMR. For instance, when analyzed together, the various views 502, 504, and 526 provide information about different sides of the object of interest and the relationship between the object of interest and the scenery. According to various embodiments, this information can be used to parse out the object of interest 508 into content and the scenery as the context. Furthermore, various algorithms can be applied to images produced by these viewpoints to create an immersive, interactive experience when viewing a MVIDMR.

Figure 6:
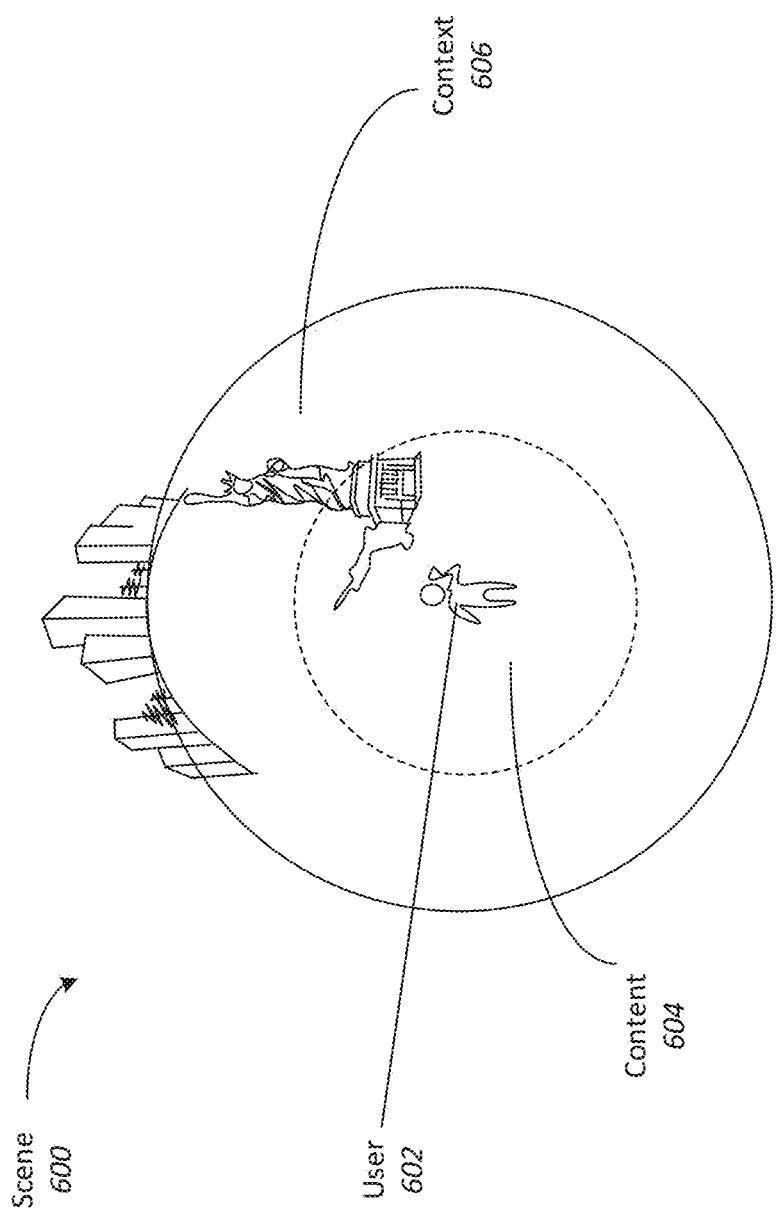
FIG. 6 illustrates one example of separation of content and context in a surround view.

FIG. 6 illustrates one example of separation of content and context in a MVIDMR. According to various embodiments, a MVIDMR is a multi-view interactive digital media representation of a scene 600. With reference to FIG. 6, shown is a user 602 located in a scene 600. The user 602 is capturing images of an object of interest, such as a statue. The images captured by the user constitute digital visual data that can be used to generate a MVIDMR.

According to various embodiments of the present disclosure, the digital visual data included in a MVIDMR can be, semantically and/or practically, separated into content 604 and context 606. According to particular embodiments, content 604 can include the object(s), person(s), or scene(s) of interest while the context 606 represents the remaining elements of the scene surrounding the content 604. In some embodiments, a MVIDMR may represent the content 604 as three-dimensional data, and the context 606 as a two-dimensional panoramic background. In other examples, a MVIDMR may represent both the content 604 and context 606 as two-dimensional panoramic scenes. In yet other examples, content 604 and context 606 may include three-dimensional components or aspects. In particular embodiments, the way that the MVIDMR depicts content 604 and context 606 depends on the capture mode used to acquire the images.

In some embodiments, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 604 and the context 606 may be the same. In these examples, the MVIDMR produced may have some characteristics that are similar to other types of digital media such as panoramas. However, according to various embodiments, MVIDMRs include additional features that distinguish them from these existing types of digital media. For instance, a MVIDMR can represent moving data. Additionally, a MVIDMR is not limited to a specific cylindrical, spherical or translational movement. Various motions can be used to capture image data with a camera or other capture device. Furthermore, unlike a stitched panorama, a MVIDMR can display different sides of the same object.

Figure 7B:
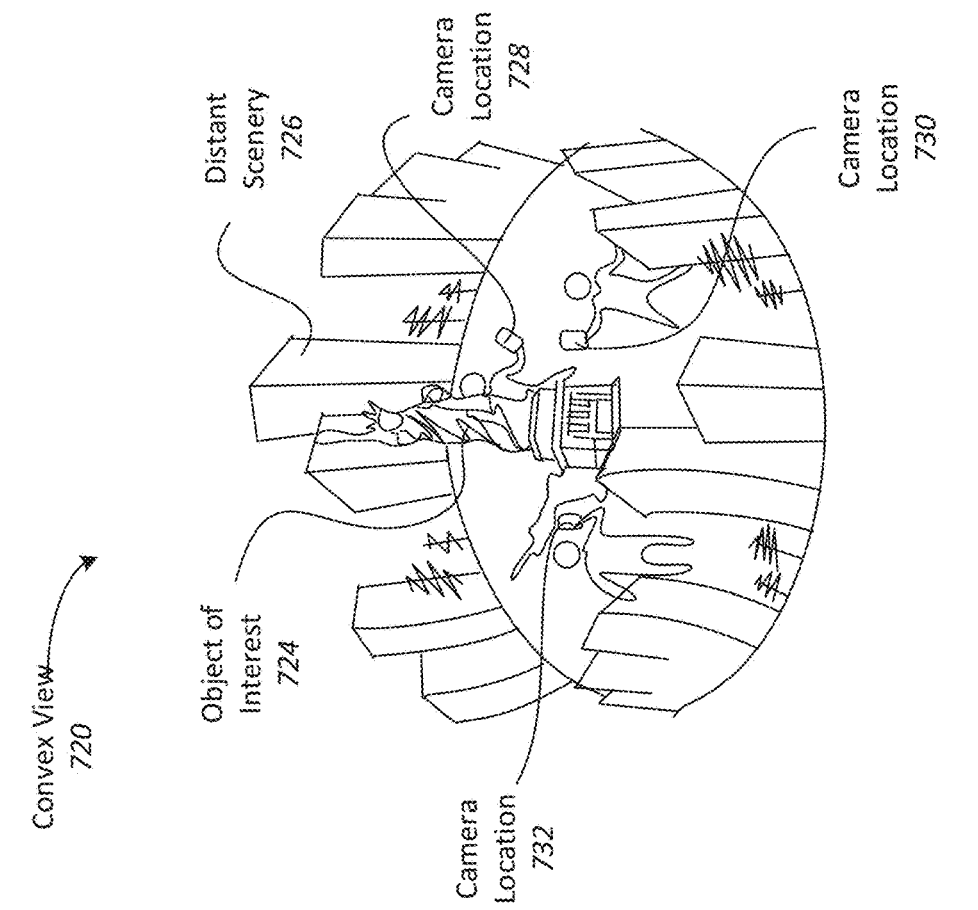
FIGS. 7A-7B illustrate examples of concave view and convex views, respectively, where both views use a back-camera capture style.
Figure 7A:
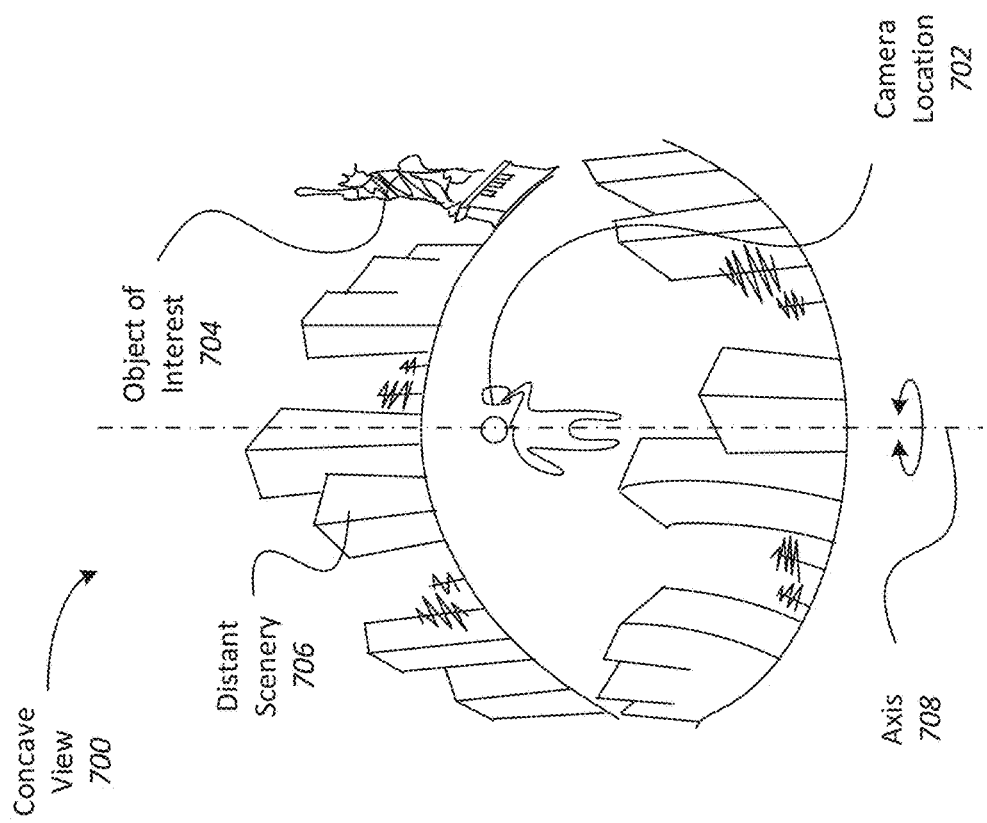

FIGS. 7A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MVIDMR.

With reference to FIG. 7A, shown is one example of a concave view 700 in which a user is standing along a vertical axis 708. In this example, the user is holding a camera, such that camera location 702 does not leave axis 708 during image capture. However, as the user pivots about axis 708, the camera captures a panoramic view of the scene around the user, forming a concave view. In this embodiment, the object of interest 704 and the distant scenery 706 are all viewed similarly because of the way in which the images are captured. In this example, all objects in the concave view appear at infinity, so the content is equal to the context according to this view.

With reference to FIG. 7B, shown is one example of a convex view 720 in which a user changes position when capturing images of an object of interest 724. In this example, the user moves around the object of interest 724, taking pictures from different sides of the object of interest from camera locations 728, 730, and 732. Each of the images obtained includes a view of the object of interest, and a background of the distant scenery 726. In the present example, the object of interest 724 represents the content, and the distant scenery 726 represents the context in this convex view.

FIGS. 8A-9B illustrate examples of various capture modes for MVIDMRs. Although various motions can be used to capture a MVIDMR and are not constrained to any particular type of motion, three general types of motion can be used to capture particular features or views described in conjunction MVIDMRs. These three types of motion, respectively, can yield a locally concave MVIDMR, a locally convex MVIDMR, and a locally flat MVIDMR. In some embodiments, a MVIDMR can include various types of motions within the same MVIDMR.

Figure 8A:
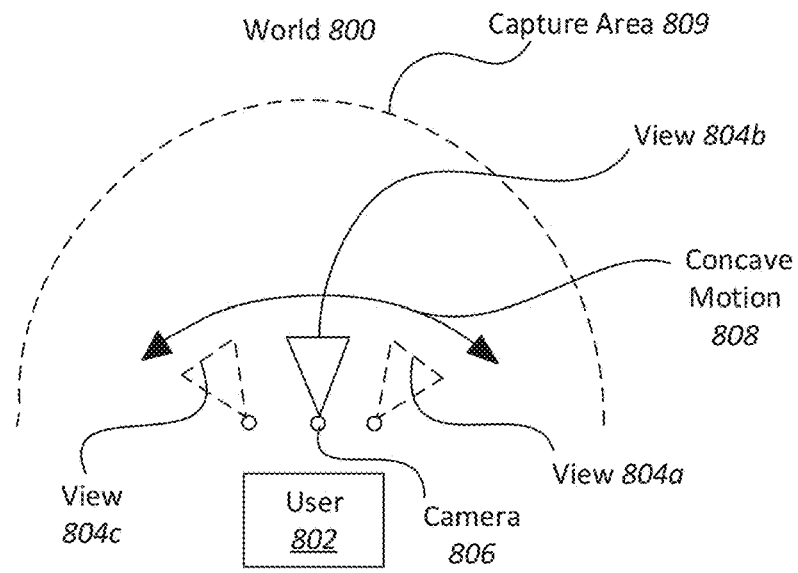
FIGS. 8A-8B illustrate examples of various capture modes for surround views.

With reference to FIG. 8A, shown is an example of a back-facing, concave MVIDMR being captured. According to various embodiments, a locally concave MVIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In some embodiments, a user 802 is using a back-facing camera 806 to capture images towards world 800, and away from user 802. As described in various examples, a back-facing camera refers to a device with a camera that faces away from the user, such as the camera on the back of a smart phone. The camera is moved in a concave motion 808, such that views 804a, 804b, and 804c capture various parts of capture area 809.

Figure 8B:
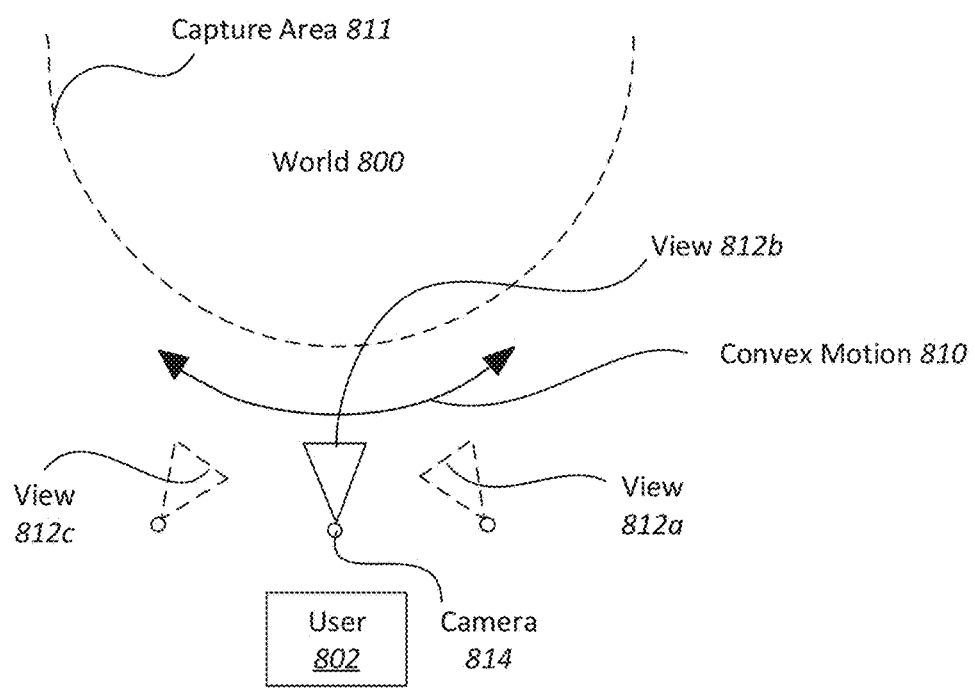

With reference to FIG. 8B, shown is an example of a back-facing, convex MVIDMR being captured. According to various embodiments, a locally convex MVIDMR is one in which viewing angles converge toward a single object of interest. In some embodiments, a locally convex MVIDMR can provide the experience of orbiting about a point, such that a viewer can see multiple sides of the same object. This object, which may be an "object of interest," can be segmented from the MVIDMR to become the content, and any surrounding data can be segmented to become the context. Previous technologies fail to recognize this type of viewing angle in the media-sharing landscape.

In some embodiments, a user 802 is using a back-facing camera 814 to capture images towards world 800, and away from user 802. The camera is moved in a convex motion 810, such that views 812a, 812b, and 812c capture various parts of capture area 811. As described above, world 800 can include an object of interest in some examples, and the convex motion 810 can orbit around this object. Views 812a, 812b, and 812c can include views of different sides of this object in these examples.

Figure 9A:
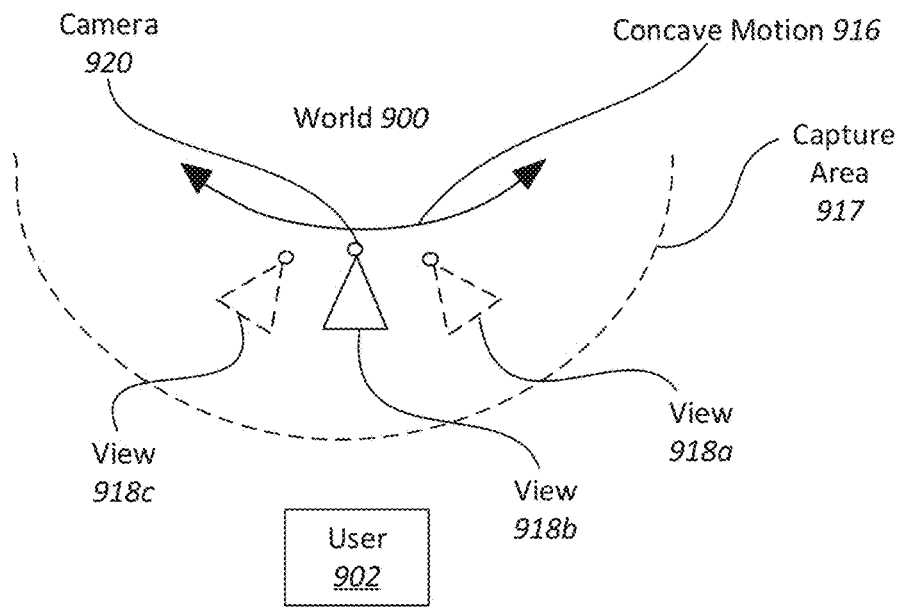
FIGS. 9A-9B illustrate examples of various capture modes for surround views.

With reference to FIG. 9A, shown is an example of a front-facing, concave MVIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In some embodiments, camera 920 is facing user 902. The camera follows a concave motion 906 such that the views 918a, 918b, and 918c diverge from each other in an angular sense. The capture area 917 follows a concave shape that includes the user at a perimeter.

Figure 9B:
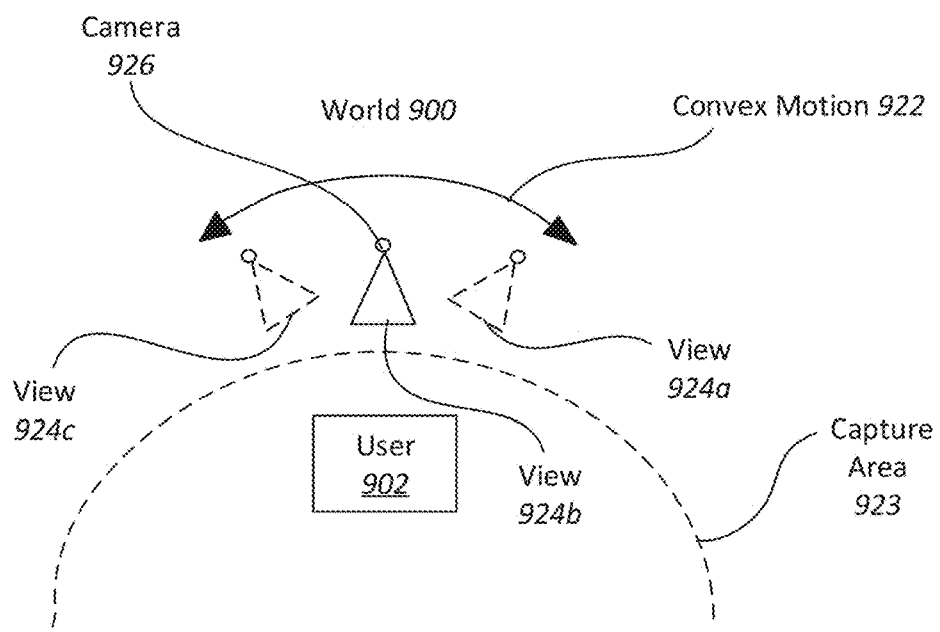

With reference to FIG. 9B, shown is an example of a front-facing, convex MVIDMR being captured. In some embodiments, camera 926 is facing user 902. The camera follows a convex motion 922 such that the views 924a, 924b, and 924c converge towards the user 902. As described above, various modes can be used to capture images for a MVIDMR. These modes, including locally concave, locally convex, and locally linear motions, can be used during capture of separate images or during continuous recording of a scene. Such recording can capture a series of images during a single session.

In some embodiments, the augmented reality system can be implemented on a mobile device, such as a cell phone. In particular, the live camera data, which is output to a display on the mobile device, can be augmented with virtual objects. The virtual objects can be rendered into the live camera data. In some embodiments, the virtual objects can provide a user feedback when images are being captured for a MVIDMR.

Figure 10:
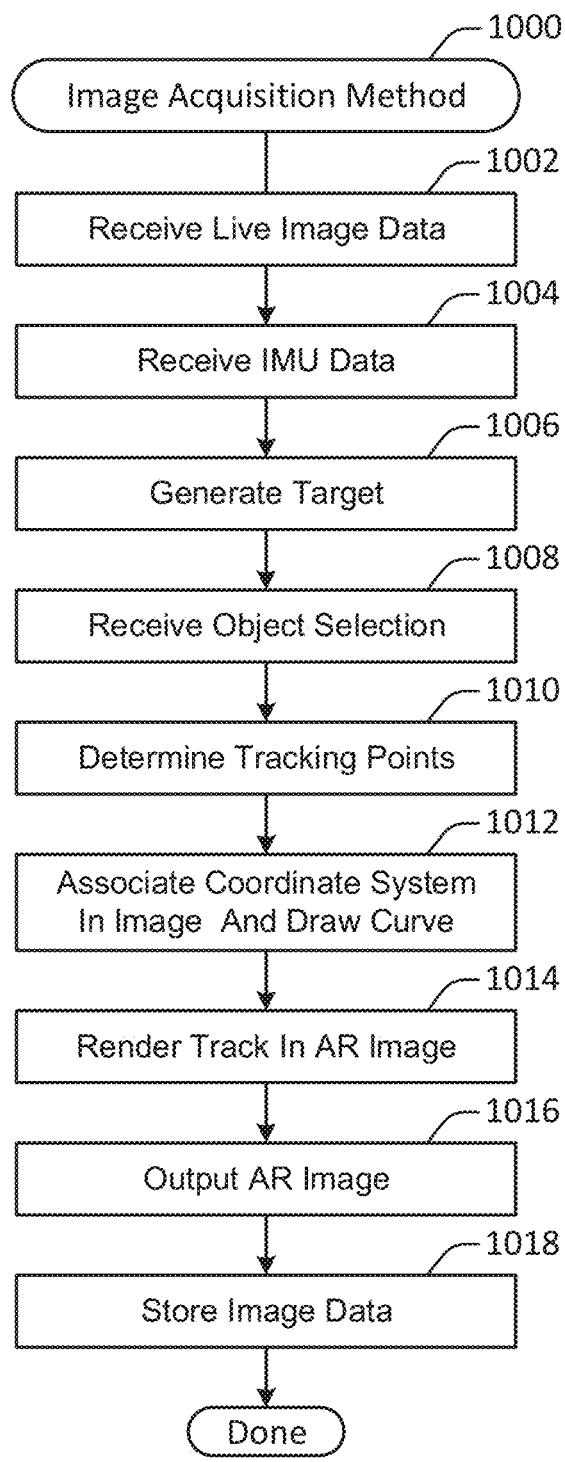
FIG. 10 illustrates an example of a process flow for capturing images in a surround view using augmented reality.
Figure 11:
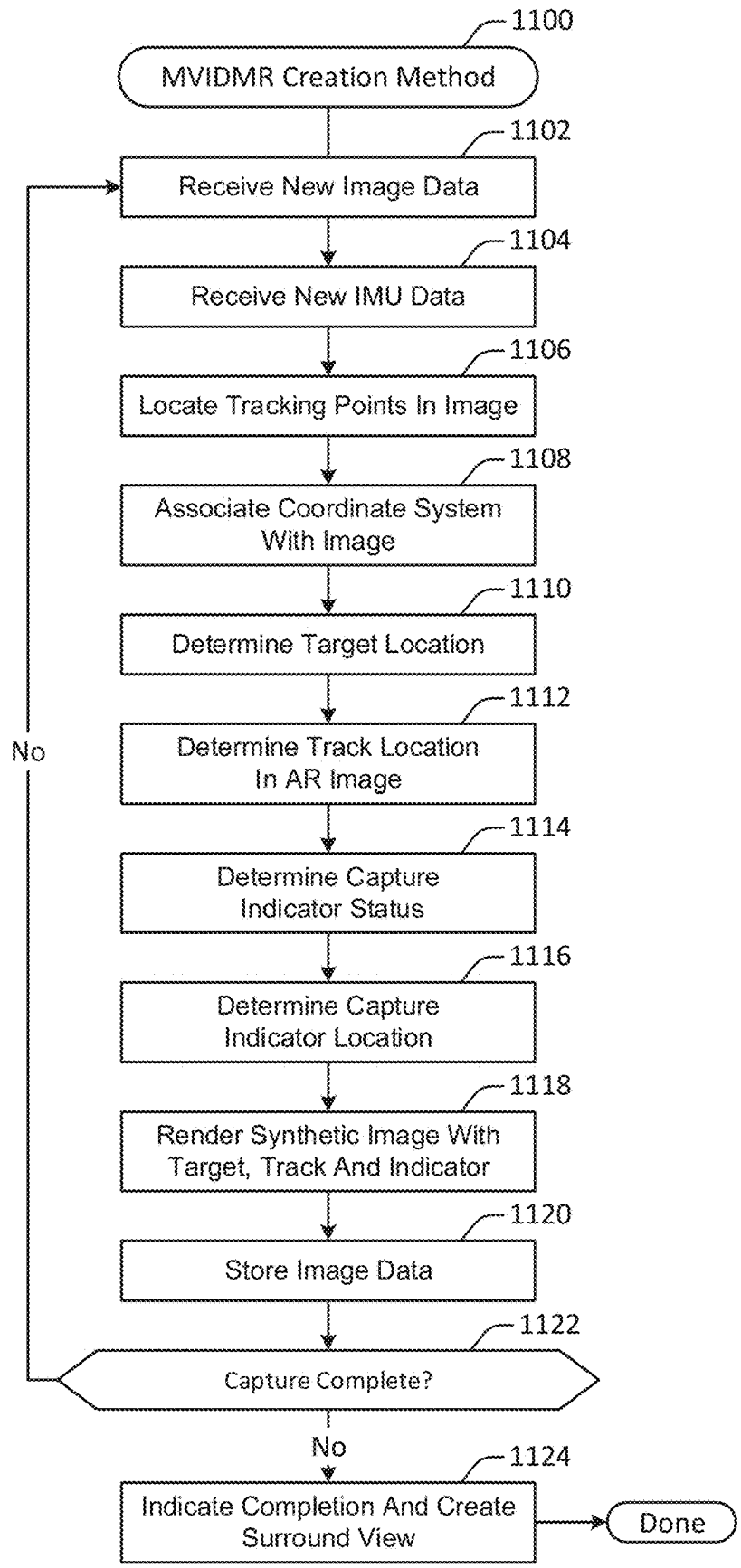
FIG. 11 illustrates an example of a process flow for capturing images in a surround view using augmented reality.

FIGS. 10 and 11 illustrate an example of a process flow for capturing images in a MVIDMR using augmented reality. In 1002, live image data can be received from a camera system. For example, live image data can be received from one or more cameras on a hand-held mobile device, such as a smartphone. The image data can include pixel data captured from a camera sensor. The pixel data varies from frame to frame. In some embodiments, the pixel data can be 2-D. In other embodiments, depth data can be included with the pixel data.

In 1004, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In some embodiments, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In some embodiments, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a MVIDMR.

Returning to FIG. 10, in 1006, virtual data associated with a target can be generated in the live image data. For example, the target can be cross hairs. In general, the target can be rendered as any shape or combinations of shapes. In some embodiments, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 1008, the object selection can be received. The object selection can be used to determine an area within the image data to identify tracking points. When the area in the image data is over a target, the tracking points can be associated with an object appearing in the live image data.

In 1010, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below. In particular embodiments, object detection and/or recognition may be used for each or most frames, for instance to facilitate identifying the location of tracking points.

In some embodiments, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data. Instead, the one or more points may be tracked based on other image characteristics that appear in successive frames. For instance, edge tracking, corner tracking, or shape tracking may be used to track one or more points from frame to frame.

One advantage of tracking objects in the manner described in the 2-D image space is that a 3-D reconstruction of an object or objects appearing in an image don't have to be performed. The 3-D reconstruction step may involve operations such as "structure from motion (SFM)" and/or "simultaneous localization and mapping (SLAM)." The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

In 1012, a 3-D coordinate system in the physical world can be associated with the image, such as the Earth reference frame, which as described above can be related to camera reference frame associated with the 2-D pixel data. In some embodiments, the 2-D image data can be calibrated so that the associated 3-D coordinate system is anchored to the selected target such that the target is at the origin of the 3-D coordinate system.

Then, in 1014, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In some embodiments, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 1014, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In some embodiments, the one or more virtual object rendered into the live image data can be used to help a user capture images used to create a MVIDMR. For example, the user can indicate a desire to create a MVIDMR of a real object identified in the live image data. The desired MVIDMR can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 1012.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 10, in 1016, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 30 frames per second can be output at 15 frames per second. In another embodiment, the AR images can be output at a reduced resolution, such as 240*p* instead of 480p. The reduced resolution can also be used to reduce computational requirements.

In 1018, one or more images can be selected from the live image data and stored for use in a MVIDMR. In some embodiments, the stored images can include one or more virtual objects. Thus, the virtual objects can be become part of the MVIDMR. In other embodiments, the virtual objects are only output as part of the AR system. But, the image data which is stored for use in the MVIDMR may not include the virtual objects.

In yet other embodiments, a portion of the virtual objects output to the display as part of the AR system can be stored. For example, the AR system can be used to render a guide during the MVIDMR image capture process and render a label associated with the MVIDMR. The label may be stored in the image data for the MVIDMR. However, the guide may not be stored. To store the images without the added virtual objects, a copy may have to be made. The copy can be modified with the virtual data and then output to a display and the original stored or the original can be stored prior to its modification.

In FIG. 11, the method in FIG. 10 is continued. In 1122, new image data can be received. In 1124, new IMU data (or, in general sensor data) can be received. The IMU data can represent a current orientation of the camera. In 1126, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 1126, a determination may be made whether a tracking point is still visible in an image. In addition, a determination may be made as to whether a new portion of the targeted object has come into view. New tracking points can be added to the new portion to allow for continued tracking of the real object from frame to frame.

In 1128, a coordinate system can be associated with the image. For example, using an orientation of the camera determined from the sensor data, the pixel data can be calibrated to an Earth reference frame as previously described. In 1130, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data. In particular embodiments, a coordinate system may be defined based on identifying a position from the tracking data and an orientation from the IMU (or other) data.

In 1132, a track location in the live image data can be determined. The track can be used to provide feedback associated with a position and orientation of a camera in physical space during the image capture process for a MVIDMR. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 1134, a capture indicator status can be determined. The capture indicator can be used to provide feedback in regards to what portion of the image data used in a MVIDMR has been captured. For example, the status indicator may indicate that half of angle range of images for use in a MVIDMR has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 1136, a capture indicator location can be determined. The location can be used to render the capture indicator into the live image and generate the synthetic image. In some embodiments, the position of the capture indicator can be determined relative to a position of the real object in the image as indicated by the current set of tracking points, such as above and to left of the real object. In 1138, a synthetic image, i.e., a live image augmented with virtual objects, can be generated. The synthetic image can include the target, the track and one or more status indicators at their determined locations, respectively. In 1140, image data captured for the purposes of use in a MVIDMR can be captured. As described above, the stored image data can be raw image data without virtual objects or may include virtual objects.

In 1142, a check can be made as to whether images needed to generate a MVIDMR have been captured in accordance with the selected parameters, such as a MVIDMR spanning a desired angle range. When the capture is not complete, new image data may be received and the method may return to 1122. When the capture is complete, a virtual object can be rendered into the live image data indicating the completion of the capture process for the MVIDMR and a MVIDMR can be created. Some virtual objects associated with the capture process may cease to be rendered. For example, once the needed images have been captured the track used to help guide the camera during the capture process may no longer be generated in the live image data.

Figure 12A:
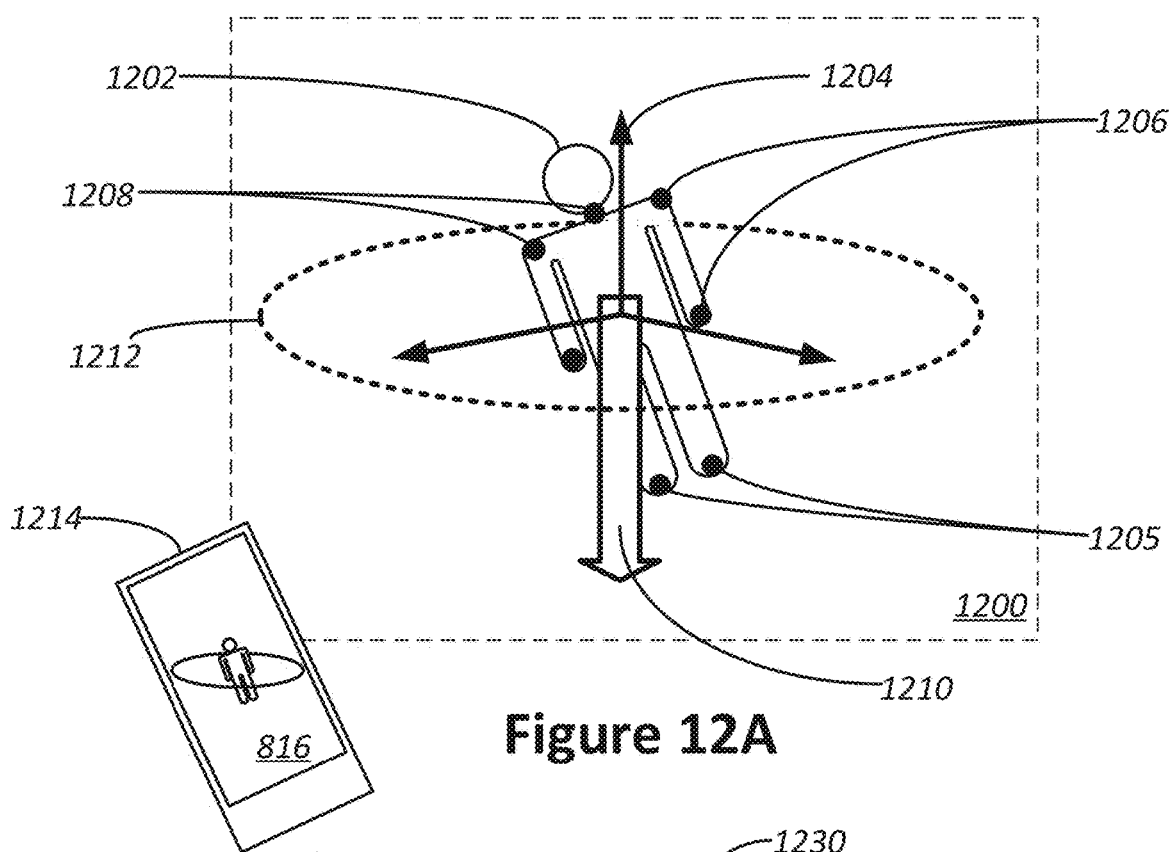
FIGS. 12A and 12B illustrate examples of generating an Augmented Reality (AR) image capture track for capturing images used in a surround view.
Figure 12B:
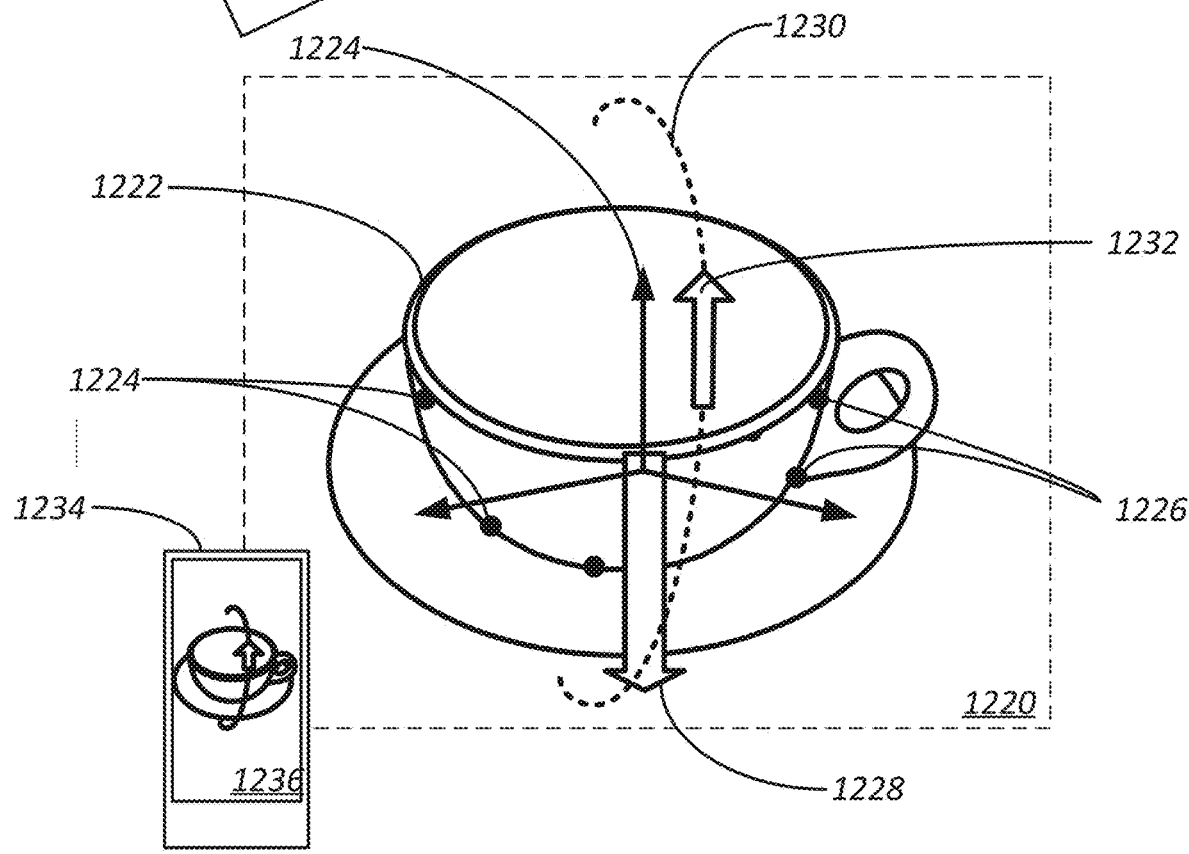

FIGS. 12A and 12B illustrate aspects of generating an Augmented Reality (AR) image capture track for capturing images used in a MVIDMR. In FIG. 12A, a mobile device 1214 with a display 1216 is shown. The mobile device can include at least one camera (not shown) with a field of view 1200. A real object 1202, which is a person, is selected in the field of view 1200 of the camera. A virtual object, which is a target (not shown), may have been used to help select the real object. For example, the target on a touch screen display of the mobile device 1214 may have been placed over the object 1202 and then selected.

The camera can include an image sensor which captures light in the field of view 1200. The data from the image sensor can be converted to pixel data. The pixel data can be modified prior to its output on display 1216 to generate a synthetic image. The modifications can include rendering virtual objects in the pixel data as part of an augmented reality (AR) system.

Using the pixel data and a selection of the object 1202, tracking points on the object can be determined. The tracking points can define the object in image space. Locations of a current set of tracking points, such as 1205, 1206 and 1208, which can be attached to the object 1202 are shown. As a position and orientation of the camera on the mobile device 1214, the shape and position of the object 1202 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 1214, an Earth reference frame 3-D coordinate system 1204 can be associated with the image data. The direction of the gravity vector is indicated by arrow 1210. As described above, in a particular embodiment, the 2-D image data can be calibrated relative to the Earth reference frame. The arrow representing the gravity vector is not rendered into the live image data. However, if desired, an indicator representative of the gravity could be rendered into the synthetic image.

A plane which is perpendicular to the gravity vector can be determined. The location of the plane can be determined using the tracking points in the image, such as 1205, 1206 and 1208. Using this information, a curve, which is a circle, is drawn in the plane. The circle can be rendered into to the 2-D image data and output as part of the AR system. As is shown on display 1216, the circle appears to surround the object 1202. In some embodiments, the circle can be used as a guide for capturing images used in a MVIDMR.

If the camera on the mobile device 1214 is rotated in some way, such as tilted, the shape of the object will change on display 1216. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 1202. Thus, the curve can appear to remain parallel to the ground, i.e., perpendicular to the gravity vector, as the camera 1214 moves. However, the position of the curve can move from location to location in the image as the position of the object and its apparent shape in the live images changes.

In FIG. 12B, a mobile device 1234 including a camera (not shown) and a display 1236 for outputting the image data from the camera is shown. A cup 1222 is shown in the field of view of camera 1220 of the camera. Tracking points, such as 1224 and 1226, have been associated with the object 1222. These tracking points can define the object 1222 in image space. Using the IMU data from the mobile device 1234, a reference frame has been associated with the image data. As described above, the pixel data can be calibrated to the reference frame. The reference frame is indicated by the 3-D axes 1224 and the direction of the gravity vector is indicated by arrow 1228.

As described above, a plane relative to the reference frame can be determined. In this example, the plane is parallel to the direction of the axis associated with the gravity vector as opposed to perpendicular to the frame. This plane is used to proscribe a path for the MVIDMR which goes over the top of the object 1230. In general, any plane can be determined in the reference frame and then a curve, which is used as a guide, can be rendered into the selected plane.

Using the locations of the tracking points, a centroid of the object 1222 on the selected plane in the reference can be determined. A curve 1230, such as a circle, can be rendered relative to the centroid. In this example, a circle is rendered around the object 1222 in the selected plane.

The curve 1230 can serve as a track for guiding the camera along a particular path where the images captured along the path can be converted into a MVIDMR. In some embodiments, a position of the camera along the path can be determined. Then, an indicator can be generated which indicates a current location of the camera along the path. In this example, current location is indicated by arrow 1232.

The position of the camera along the path may not directly map to physical space, i.e., the actual position of the camera in physical space doesn't have to be necessarily determined. For example, an angular change can be estimated from the IMU data and optionally the frame rate of the camera. The angular change can be mapped to a distance moved along the curve where the ratio of the distance moved along the path 1230 is not a one to one ratio with the distance moved in physical space. In another example, a total time to traverse the path 1230 can be estimated and then the length of time during which images have been recorded can be tracked. The ratio of the recording time to the total time can be used to indicate progress along the path 1230.

The path 1230, which is an arc, and arrow 1232 are rendered into the live image data as virtual objects in accordance with their positions in the 3-D coordinate system associated with the live 2-D image data. The cup 1222, the circle 1230 and the 1232 arrow are shown output to display 1236. The orientation of the curve 1230 and the arrow 1232 shown on display 1236 relative to the cup 1222 can change if the orientation of the camera is changed, such as if the camera is tilted.

In particular embodiments, a size of the object 1222 in the image data can be changed. For example, the size of the object can be made bigger or smaller by using a digital zoom. In another example, the size of the object can be made bigger or smaller by moving the camera, such as on mobile device 1234, closer or farther away from the object 1222.

When the size of the object changes, the distances between the tracking points can change, i.e., the pixel distances between the tracking points can increase or can decrease. The distance changes can be used to provide a scaling factor. In some embodiments, as the size of the object changes, the AR system can be configured to scale a size of the curve 1230 and/or arrow 1232. Thus, a size of the curve relative to the object can be maintained.

In another embodiment, a size of the curve can remain fixed. For example, a diameter of the curve can be related to a pixel height or width of the image, such as 120 percent of the pixel height or width. Thus, the object 1222 can appear to grow or shrink as a zoom is used or a position of the camera is changed. However, the size of curve 1230 in the image can remain relatively fixed.

Figure 13:
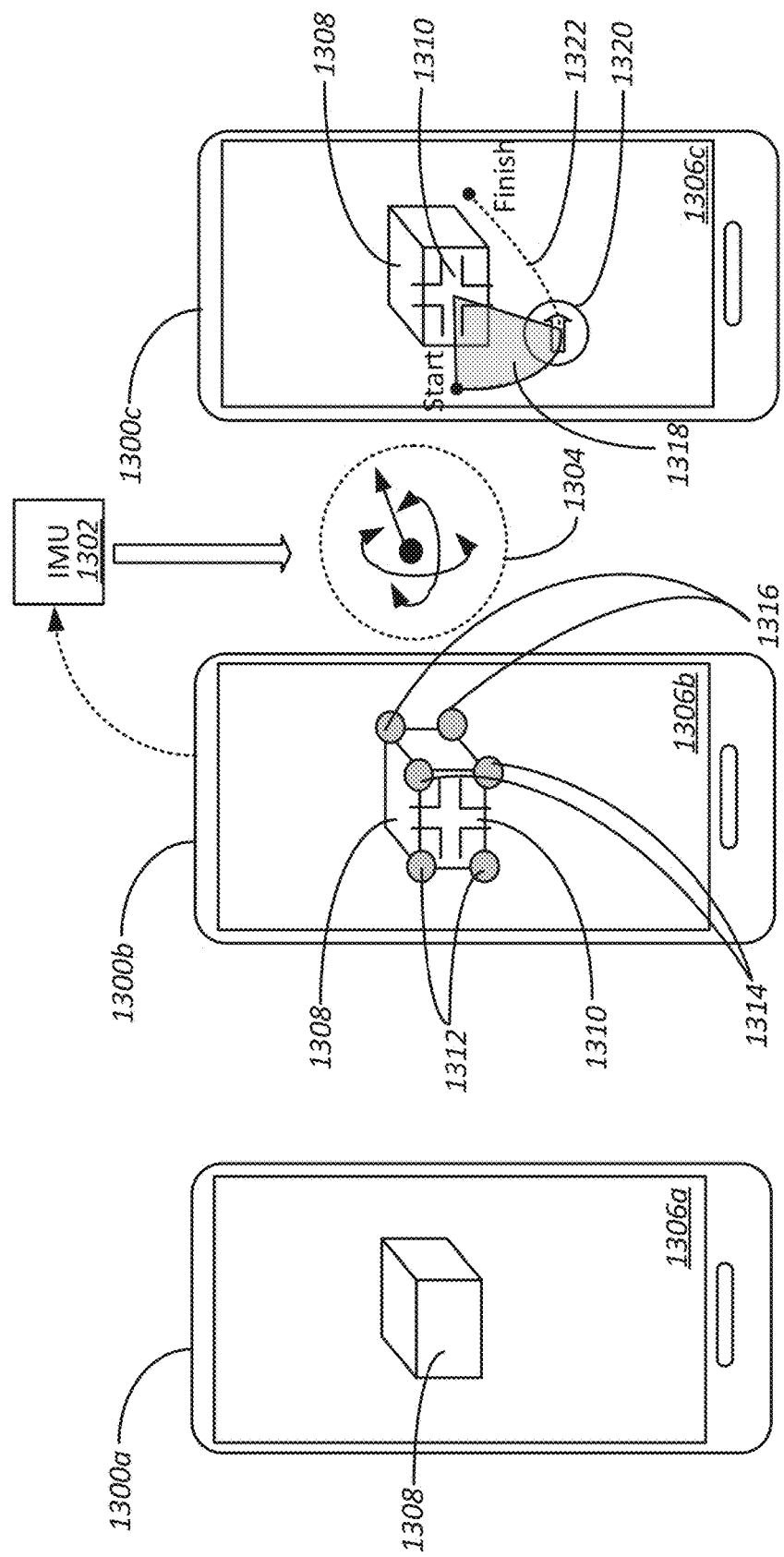
FIG. 13 illustrates an example of generating an Augmented Reality (AR) image capture track for capturing images used in a surround view on a mobile device.

FIG. 13 illustrates a second example of generating an Augmented Reality (AR) image capture track for capturing images used in a MVIDMR on a mobile device. FIG. 13 includes a mobile device at three times 1300a, 1300b and 1300c. The device can include at least one camera, a display, an IMU, a processor (CPU), memory, microphone, audio output devices, communication interfaces, a power supply, graphic processor (GPU), graphical memory and combinations thereof. The display is shown with images at three times 1306a, 1306b and 1306c. The display can be overlaid with a touch screen.

In 1306a, an image of an object 1308 is output to the display in state 1306a. The object is a rectangular box. The image data output to the display can be live image data from a camera on the mobile device. The camera could also be a remote camera.

In some embodiments, a target, such as 1310, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 1312, 1314 and 1316. In some embodiments, the tracking points may not appear on the display. In another embodiment, the tracking points may be rendered to the display. In some embodiments, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 1304. The orientation change and current orientation of the device can be captured via the IMU data from IMU 1302 on the device.

As the orientation of the device is changed, one or more of the tracking points, such as 1312, 1314 and 1316, can be occluded. In addition, the shape of surfaces currently appearing in the image can change. Based on changes between frames, movement at various pixel locations can be determined. Using the IMU data and the determined movement at the various pixel locations, surfaces associated with the object 1308 can be predicted. The new surfaces can be appearing in the image as the position of the camera changes. New tracking points can be added to these surfaces.

As described above, the mobile device can be used to capture images used in a MVIDMR. To aid in the capture, the live image data can be augmented with a track or other guides to help the user move the mobile device correctly. The track can include indicators that provide feedback to a user while images associated with a MVIDMR are being recorded. In 1306c, the live image data is augmented with a path 1322. The beginning and end of the path is indicated by the text, "start" and "finish." The distance along the path is indicated by shaded region 1318.

The circle with the arrow 1320 is used to indicate a location on the path. In some embodiments, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the MVIDMR. Colors or other indicators can be used to indicate the status. For example, the arrow and/or circle can be rendered green when the mobile device is properly following the path and red when the position/orientation of the camera relative to the object is less than optimal.

Figure 14A:
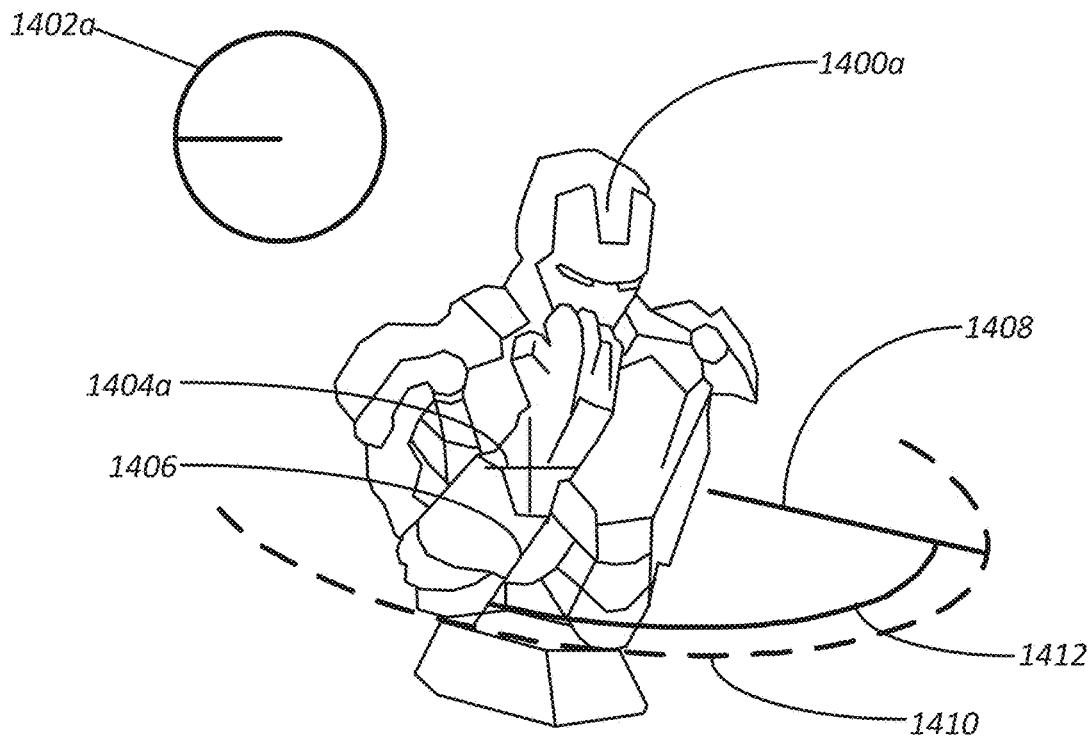
FIGS. 14A and 14B illustrate an example of generating an Augmented Reality (AR) image capture track including status indicators for capturing images used in a surround view.
Figure 14B:
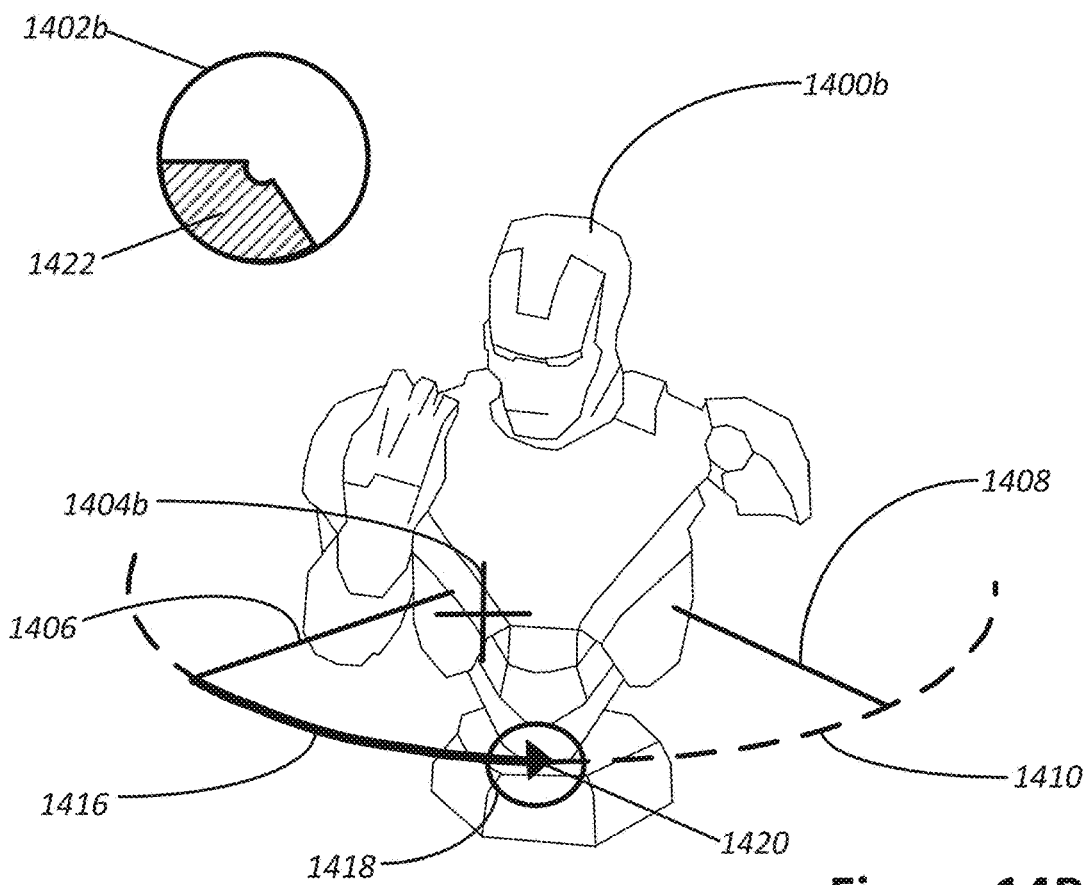

FIGS. 14A and 14B illustrate yet another example of generating an Augmented Reality (AR) image capture track including status indicators for capturing images used in a MVIDMR. The synthetic image generated by the AR system can consist of live image data from a camera augmented with one or more virtual objects. For example, as described above, the live image data can be from a camera on a mobile device.

In FIG. 14A, an object 1400a, which is a statue, is shown in an image 1415 from a camera at a first position and orientation. The object 1400a can be selected via the cross hairs 1404a. Once the cross hairs are placed on the object and the object is selected, the cross hairs can move and remain on the object as the object 1400a moves in the image data. As described above, as an object's position/orientation changes in an image, a location to place the cross hairs in an image can be determined. In some embodiments, the position of the cross hairs can be determined via tracking the movements of points in the image, i.e., the tracking points.

In particular embodiments, if another object is moved in front of a tracked object, it may not be possible to associate the target 1404a with the object. For example, if a person moves in front of the camera, a hand is passed in front of the camera or the camera is moved so the object no longer appears in the camera field of view, then the object which is being tracked will no longer be visible. Hence, it may not be possible to determine a location for the target associated with the tracked object. In the instance where the object reappears in the image, such as if a person that blocked the view of the object moved into and out of the view, then the system can be configured to reacquire the tracking points and reposition the target.

A first virtual object is rendered as indicator 1402a. Indicator 1402a can be used to indicate the progress in capturing images for a MVIDMR. A second virtual object is rendered as curve 1410. Third and fourth virtual objects are rendered as lines 1406 and 1408. A fifth virtual object is rendered as curve 1412.

The curve 1410 can be used to depict a path of a camera. Whereas lines 1406 and 1408 and curve 1412 can be used to indicate an angle range for the MVIDMR. In this example, the angle range is about ninety degrees.

In FIG. 14B, the position of the camera is different as compared to FIG. 14A. Hence, a different view of object 1400b is presented in image 1425. In particular, the camera view shows more of the front of the object as compared to the view in FIG. 14A. The target 1404b is still affixed to the object 1400b. However, the target is fixed in a different location on the object, i.e., on a front surface as opposed to an arm.

The curve 1416 with arrow 1420 at the end is used to indicate the progress of the image capture along curve 1410. The circle 1418 around the arrow 1420 further highlights the current position of the arrow. As described above, a position and a direction of the arrow 1420 can be used to provide feedback to a user on a deviation of the camera position and/or orientation from curve 1410. Based upon this information, the user may adjust a position and/or orientation of the camera while it is capturing the image data.

Lines 1406 and 1408 still appear in the image but are positioned differently relative to object 1400b. The lines again indicate an angle range. In 1420, the arrow is about half way between lines 1406 and 1408. Hence, an angle of about 45 degrees has been captured around the object 1400b.

The indicator 1402b now includes a shaded region 1422. The shaded region can indicate a portion of a MVIDMR angle range currently captured. In some embodiments, lines 1406 and 1408 can only indicate a portion of the angle range in a MVIDMR that is being captured and the total angle range can be shown via indicator 1402b. In this example, the angle range shown by indicator 1402b is three hundred sixty degrees while lines 1406 and 1408 show a portion of this range which ninety degrees.

Figure 15:
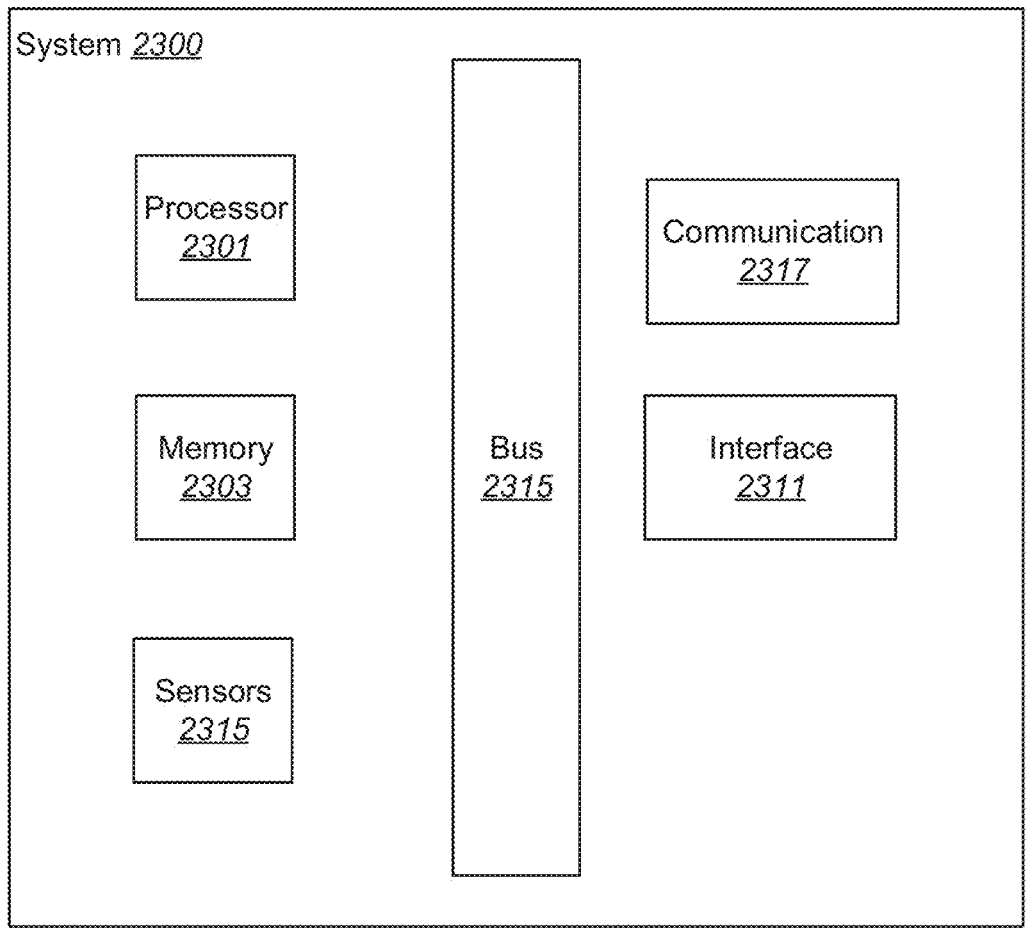
FIG. 15 illustrates a particular example of a computer system configured in accordance with one or more embodiments.

With reference to FIG. 15, shown is a particular example of a computer system that can be used to implement particular examples. For instance, the computer system 1500 can be used to provide MVIDMRs according to various embodiments described above. According to various embodiments, a system 1500 suitable for implementing particular embodiments includes a processor 1501, a memory 1503, an interface 1511, and a bus 1515 (e.g., a PCI bus).

The system 1500 can include one or more sensors, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 1511 may include separate input and output interfaces, or may be a unified interface supporting both operations. Examples of input and output interfaces can include displays, audio devices, cameras, touch screens, buttons and microphones. When acting under the control of appropriate software or firmware, the processor 1501 is responsible for such tasks such as optimization. Various specially configured devices can also be used in place of a processor 1501 or in addition to processor 1501, such as graphical processor units (GPUs). The complete implementation can also be done in custom hardware. The interface 1511 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 1500 uses memory 1503 to store data and program instructions and maintained a local side cache. The program instructions may control the operation of an operating system and/or one or more applications, for example. The memory or memories may also be configured to store received metadata and batch requested metadata.

The system 1500 can be integrated into a single device with a common housing. For example, system 1500 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1500 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Figure 16:
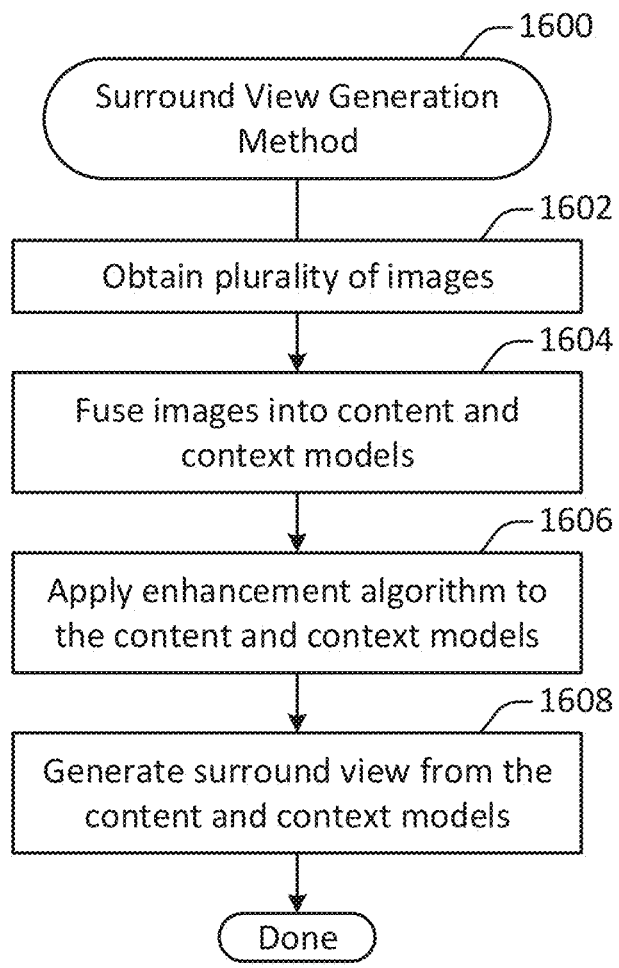
FIG. 16 illustrates an example of a process flow for generating a surround view.

FIG. 16 shows an example of a process flow diagram for generating a MVIDMR 1600. In the present example, a plurality of images is obtained at 1602. According to various embodiments, the plurality of images can include two-dimensional (2D) images or data streams. These 2D images can include location information that can be used to generate a MVIDMR.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 1602 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 1604. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 1606. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 1608. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of specific rendering algorithms. However, the techniques of the present invention apply to a wide variety of rendering algorithms. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A computing device comprising:
a camera operable to capture an image of object identification information uniquely identifying an object in physical proximity to a client machine;
a communication interface operable to transmit the object identification information to a remote server and to receive from the server a security key associated with the object;
generating a watermark using the security key;
a processor operable to generate a multi-view interactive digital media representation (MVIDMR), the MVIDMR including a plurality of images of the object captured via the camera, each of the images being captured from a respective viewpoint, the viewpoints corresponding to the movement of the computing device through space in proximity to the object, the MVIDMR including the watermark generated using the security key, wherein the MVIDMR is transmitted to the remote server via the communication interface, wherein the server verifies that the computing device is located where the object is supposed to be located and that the MVIDMR is generated in the time period between when the security key is sent and the time when the MVIDMR is received by the server; and
a display screen via which the MVIDMR is navigable in one or more dimensions.

2. The computing device recited in claim 1, wherein:
inertial measurement unit (IMU) data is captured from an IMU located within the client machine.

3. The computing device recited in claim 2, wherein the IMU includes one or more accelerometers, and wherein the IMU data includes information characterizing acceleration of the client machine through space during various periods of time.

4. The computing device recited in claim 2, wherein the MVIDMR is generated in part based on the IMU data.

5. The computing device recited in claim 4, wherein generating the MVIDMR comprises positioning the images with respect to each other based in part on the IMU data.

6. The computing device recited in claim 1, wherein the communication interface is further operable to transmit geolocation information to the remote server.

7. The computing device recited in claim 6, wherein the geolocation information includes global positioning system (GPS) coordinates.

8. The computing device recited in claim 1, wherein the movement of the computing device through space comprises a 360-degree arc around the object.

9. The computing device recited in claim 1, wherein generating the MVIDMR comprises:
identifying a plurality of key points associated with the object;
for each of the images, determining respective locations for one or more of the key points in the image; and
positioning the images with respect to each other based in part on the key point locations.

10. The computing device recited in claim 1, wherein the object is a vehicle, and wherein the object identification information comprises a vehicle identification number (VIN).

11. The computing device recited in claim 10, wherein transmitting the object identification information comprises transmitting a picture of a VIN plate on a vehicle dashboard.

12. A method comprising:
transmitting object identification information from a client machine to a remote verification server, the object identification information uniquely identifying an object in physical proximity to the client machine;
receiving from the server a security key associated with the object;
generating a watermark using the security key;
generating at the client machine a multi-view interactive digital media representation (MVIDMR), the MVIDMR including a plurality of images of the object, each of the images being captured from a respective viewpoint, the viewpoints corresponding to the movement of the client machine through space in proximity to the object, the MVIDMR including the watermark generated using the security key, the MVIDMR being navigable in one or more dimensions via a user interface at the client machine; and
transmitting the MVIDMR to the remote verification server, wherein the server verifies that the computing device is located where the object is supposed to be located and that the MVIDMR is generated in the time period between when the security key is sent and the time when the MVIDMR is received by the server.

13. The method recited in claim 12, the method further comprising:
capturing inertial measurement unit (IMU) data from an IMU located within the client machine.

14. The method recited in claim 13, wherein the IMU includes one or more accelerometers, and wherein the IMU data includes information characterizing acceleration of the client machine through space during various periods of time.

15. The method recited in claim 13, wherein the MVIDMR is generated in part based on the IMU data.

16. The method recited in claim 12, the method further comprising transmitting geolocation information to the verification server.

17. The method recited in claim 16, wherein the geolocation information includes global positioning system (GPS) coordinates.

18. The method recited in claim 12, wherein the movement of the computing device through space comprises a 360-degree arc around the object.

19. One or more non-transitory computer readable media having instructions stored thereon for performing a method, the method comprising:
transmitting object identification information from a client machine to a remote verification server, the object identification information uniquely identifying an object in physical proximity to the client machine;
receiving from the server a security key associated with the object;
generating a watermark using the security key;
generating at the client machine a multi-view interactive digital media representation (MVIDMR), the MVIDMR including a plurality of images of the object, each of the images being captured from a respective viewpoint, the viewpoints corresponding to the movement of the client machine through space in proximity to the object, the MVIDMR including the watermark generated using the security key, the MVIDMR being navigable in one or more dimensions via a user interface at the client machine; and
transmitting the MVIDMR to the remote verification server, wherein the server verifies that the computing device is located where the object is supposed to be located and that the MVIDMR is generated in the time period between when the security key is sent and the time when the MVIDMR is received by the server.

20. The one or more non-transitory computer readable media recited in claim 19, the method further comprising:
capturing inertial measurement unit (IMU) data from an IMU located within the client machine, wherein the IMU includes one or more accelerometers, and wherein the IMU data includes information characterizing acceleration of the client machine through space during various periods of time, and wherein the MVIDMR is generated in part based on the IMU data.

* * * * *